(12) United States Patent
Gardiner et al.

(10) Patent No.: US 7,046,905 B1
(45) Date of Patent: *May 16, 2006

(54) BLACKLIGHT WITH STRUCTURED SURFACES

(75) Inventors: Mark E. Gardiner, Santa Rosa, CA (US); Sanford Cobb, Lakeland, MN (US); Wade D. Kretman, Afton, MN (US)

(73) Assignee: 3M Innovative Properties Company

( * ) Notice: Subject to any disclaimer, the term of this patent is extended or adjusted under 35 U.S.C. 154(b) by 393 days.

This patent is subject to a terminal disclaimer.

(21) Appl. No.: 09/613,313

(22) Filed: Jul. 11, 2000

Related U.S. Application Data

(63) Continuation-in-part of application No. 09/415,471, filed on Oct. 8, 1999.

(51) Int. Cl.
*G02B 6/10* (2006.01)

(52) U.S. Cl. .......................................... 385/146; 385/31
(58) Field of Classification Search .................. 361/33, 361/31, 330, 333, 336, 337; 385/146
See application file for complete search history.

(56) References Cited

U.S. PATENT DOCUMENTS

| | | |
|---|---|---|
| 586,214 A | 7/1897 | Basquin |
| 586,220 A | 7/1897 | Basquin |
| 586,247 A | 7/1897 | Soper |
| 586,248 A | 7/1897 | Soper |

(Continued)

FOREIGN PATENT DOCUMENTS

| | | |
|---|---|---|
| EP | 0 167 721 A1 | 1/1986 |
| EP | 0 534 140 A1 | 3/1993 |
| EP | 0 770 818 A2 | 5/1997 |
| EP | 0 787 942 A2 | 8/1997 |

(Continued)

OTHER PUBLICATIONS

IBM Technical Disclosure Bulletin, vol. 29, No. 11, *Backlighting for Liquid Crystal Display*, Apr. 1987.
IBM Technical Disclosure Bulletin, vol. 31, No. 2, *Flat Panel Backlight Reflecting Device*, Jul. 1988.
IBM Technical Disclosure Bulletin, vol. 33, No. 1B, *Polarized Backlight for Liquid Crystal Display*, Jun. 1990.
IBM Technical Disclosure Bulletin, vol. 33, No. 9, *High Efficiency Back Light for LCD*, Feb. 1991.
JP 096031217A, Machine Translation, ISTA's Paterra(tm), 20 pages.
JP 2000089009A, Machine Translation, ISTA's Paterra(tm), 20 pages.
International Search Report PCT/US01/21294 dated Jan. 25, 2001.

*Primary Examiner*—Zandra V. Smith
*Assistant Examiner*—Juan D Valentin, II
(74) *Attorney, Agent, or Firm*—Stephen W. Buckingham

(57) ABSTRACT

A backlight includes a lightguide, a light source disposed with respect to the lightguide to introduce light into the lightguide and a turning film. Optical structures are formed in one of an output surface and a back surface of the lightguide. The optical structures are arranged to extract light from the lightguide. A back reflector is disposed adjacent the back surface. The optical structures are formed to include a varying pattern arranged to mask non-uniformities in the output of the lightguide.

24 Claims, 17 Drawing Sheets

U.S. PATENT DOCUMENTS

| | | | |
|---|---|---|---|
| 586,249 A | 7/1897 | Soper | |
| 586,251 A | 7/1897 | Soper | |
| 586,252 A | 7/1897 | Soper | |
| 607,792 A | 7/1898 | Winger | |
| 650,209 A | 5/1900 | White | |
| 713,182 A | 11/1902 | Wadsworth | |
| 719,066 A | 1/1903 | Wadsworth | |
| 720,386 A | 2/1903 | Wadsworth | |
| 720,987 A | 2/1903 | Wadsworth | |
| 752,429 A | 2/1904 | Wadsworth | |
| 755,196 A | 3/1904 | Wadsworth | |
| 818,208 A | 4/1906 | Wadsworth | |
| 2,099,034 A | 11/1937 | Rolph | 240/106 |
| 2,115,178 A | 4/1938 | Rolph | 240/106 |
| 2,143,148 A | 1/1939 | Guth | 240/78 |
| 2,179,863 A | 11/1939 | Rolph | 88/60 |
| 2,223,841 A | 12/1940 | Biller | 240/78 |
| 2,347,665 A | 5/1944 | Christensen et al. | 240/2 |
| 2,398,507 A | 4/1946 | Rolph | 240/9 |
| 2,714,816 A | 8/1955 | Pennell | 72/41 |
| 2,844,998 A | 7/1958 | Vincent | 88/60 |
| 3,721,818 A | 3/1973 | Stahlhut | 240/106 |
| 3,735,124 A | 5/1973 | Stahlut | 240/106 |
| 3,994,564 A | 11/1976 | Somogyi | 350/160 |
| 4,053,208 A | 10/1977 | Kato et al. | 350/117 |
| 4,127,693 A | 11/1978 | Lemelson | 428/163 |
| 4,233,651 A | 11/1980 | Fabbri | 362/33 |
| 4,242,723 A | 12/1980 | Fabbri et al. | 362/33 |
| 4,298,249 A | 11/1981 | Gloor et al. | 350/338 |
| 4,337,759 A | 7/1982 | Popovich et al. | 126/417 |
| 4,416,515 A | 11/1983 | Funada et al. | 350/350 |
| 4,450,509 A | 5/1984 | Henry | 362/216 |
| 4,542,449 A | 9/1985 | Whitehead | 362/330 |
| 4,755,921 A | 7/1988 | Nelson | 362/307 |
| 4,804,253 A | 2/1989 | Stewart | 350/330 |
| 4,870,484 A | 9/1989 | Sonehara | 358/59 |
| 4,906,070 A | 3/1990 | Cobb, Jr. | 350/286 |
| 4,984,144 A | 1/1991 | Cobb, Jr. et al. | 362/339 |
| 5,005,108 A | 4/1991 | Pristash et al. | 362/31 |
| 5,022,728 A | 6/1991 | Fandrich | 350/96.1 |
| 5,040,883 A | 8/1991 | Cobb | |
| 5,079,675 A | 1/1992 | Nakayama | 362/31 |
| 5,126,882 A | 6/1992 | Oe et al. | 359/619 |
| 5,128,783 A | 7/1992 | Abileah et al. | 359/49 |
| 5,151,801 A | 9/1992 | Hiroshima | 359/40 |
| 5,161,041 A | 11/1992 | Abileah et al. | 359/40 |
| 5,190,370 A | 3/1993 | Miller et al. | 362/340 |
| 5,206,746 A | 4/1993 | Ooi et al. | 359/40 |
| 5,262,928 A | 11/1993 | Kashima et al. | 362/31 |
| 5,280,371 A | 1/1994 | McCartney, Jr. et al. | 359/49 |
| 5,303,322 A * | 4/1994 | Winston et al. | 385/146 |
| 5,394,255 A | 2/1995 | Yokota et al. | 359/49 |
| 5,396,350 A | 3/1995 | Beeson et al. | 359/40 |
| 5,402,324 A | 3/1995 | Yokoyama et al. | 362/19 |
| 5,467,208 A * | 11/1995 | Kokawa et al. | 349/67 |
| 5,467,417 A | 11/1995 | Nakamura et al. | 385/36 |
| 5,485,291 A * | 1/1996 | Qiao et al. | 349/62 |
| 5,499,138 A | 3/1996 | Iba | 359/569 |
| 5,521,797 A | 5/1996 | Kashima et al. | 362/31 |
| 5,550,657 A | 8/1996 | Tanaka et al. | 359/49 |
| 5,552,907 A | 9/1996 | Yokota et al. | 359/49 |
| 5,575,549 A * | 11/1996 | Ishikawa et al. | 362/31 |
| 5,587,816 A | 12/1996 | Gunjima et al. | 349/62 |
| 5,592,332 A | 1/1997 | Nishio et al. | 359/619 |
| 5,594,830 A | 1/1997 | Winston et al. | 385/146 |
| 5,598,280 A | 1/1997 | Nishio et al. | 349/57 |
| 5,600,455 A | 2/1997 | Ishikawa et al. | 349/57 |
| 5,600,462 A | 2/1997 | Suzuki et al. | 349/112 |
| 5,627,926 A | 5/1997 | Nakamura et al. | 385/36 |
| 5,711,589 A | 1/1998 | Oe et al. | 362/31 |
| 5,735,590 A | 4/1998 | Kashima et al. | 362/31 |
| 5,771,328 A * | 6/1998 | Wortman et al. | 385/146 |
| 5,775,791 A | 7/1998 | Yoshikawa | |
| 5,779,337 A | 7/1998 | Saito et al. | 362/31 |
| 5,783,120 A | 7/1998 | Ouderkirk et al. | |
| 5,808,709 A | 9/1998 | Davis et al. | 349/65 |
| 5,825,542 A | 10/1998 | Cobb, Jr. et al. | |
| 5,825,543 A | 10/1998 | Ouderkirk et al. | |
| 5,828,488 A | 10/1998 | Ouderkirk et al. | 359/487 |
| 5,831,697 A | 11/1998 | Evanicky et al. | 349/62 |
| 5,854,872 A * | 12/1998 | Tai | 385/133 |
| 5,921,651 A | 7/1999 | Ishikawa | |
| 5,997,148 A | 12/1999 | Ohkawa | |
| 5,999,685 A | 12/1999 | Goto | |
| 6,027,222 A | 2/2000 | Oki et al. | 362/31 |
| 6,088,074 A * | 7/2000 | Suzuki | 362/31 |
| 6,104,455 A | 8/2000 | Kashima | |
| 6,322,236 B1 | 11/2001 | Campbell et al. | |
| 6,330,386 B1 * | 12/2001 | Wagner et al. | 385/120 |
| 6,354,709 B1 | 3/2002 | Campbell et al. | |

FOREIGN PATENT DOCUMENTS

| | | |
|---|---|---|
| EP | 0 426 411 B1 | 4/2005 |
| FR | 2 606 861 A1 | 5/1988 |
| GB | 806124 | 12/1958 |
| JP | 52-6496 | 1/1977 |
| JP | 54-127299 | 10/1979 |
| JP | 60-70601 | 4/1985 |
| JP | 60-73618 | 4/1985 |
| JP | 61-11782 | 1/1986 |
| JP | 61-158367 | 7/1986 |
| JP | 63-10402 | 1/1988 |
| JP | 2-28842 | 6/1990 |
| JP | 2-176629 | 7/1990 |
| JP | 2-214822 | 8/1990 |
| JP | 3-184020 | 8/1991 |
| JP | 3-184021 | 8/1991 |
| JP | 3-191329 | 8/1991 |
| JP | 6-18707 | 1/1994 |
| JP | 6-82635 | 3/1994 |
| JP | 6-242322 | 9/1994 |
| JP | 07-159622 | 6/1995 |
| JP | 07159622 | 6/1995 |
| JP | 08304607 A | 11/1996 |
| JP | 2559579 | 12/1996 |
| JP | 9-5528 | 1/1997 |
| JP | 09080429 A | 3/1997 |
| JP | 09105804 A | 4/1997 |
| JP | 09138301 A | 5/1997 |
| JP | 09145932 A | 6/1997 |
| JP | 09145933 | 6/1997 |
| JP | 09197134 A | 7/1997 |
| JP | 09306221 | 11/1997 |
| JP | 10160939 A | 6/1998 |
| JP | 10282316 A | 10/1998 |
| JP | 10282343 A | 10/1998 |
| JP | 10-339815 | 12/1998 |
| JP | 11202135 | 7/1999 |
| JP | 11250714 | 9/1999 |
| JP | 2000089009 A | 3/2000 |
| WO | WO 89/02606 | 3/1989 |
| WO | WO-95/27919 | 10/1995 |
| WO | WO-01/27527 A1 | 4/2001 |

* cited by examiner

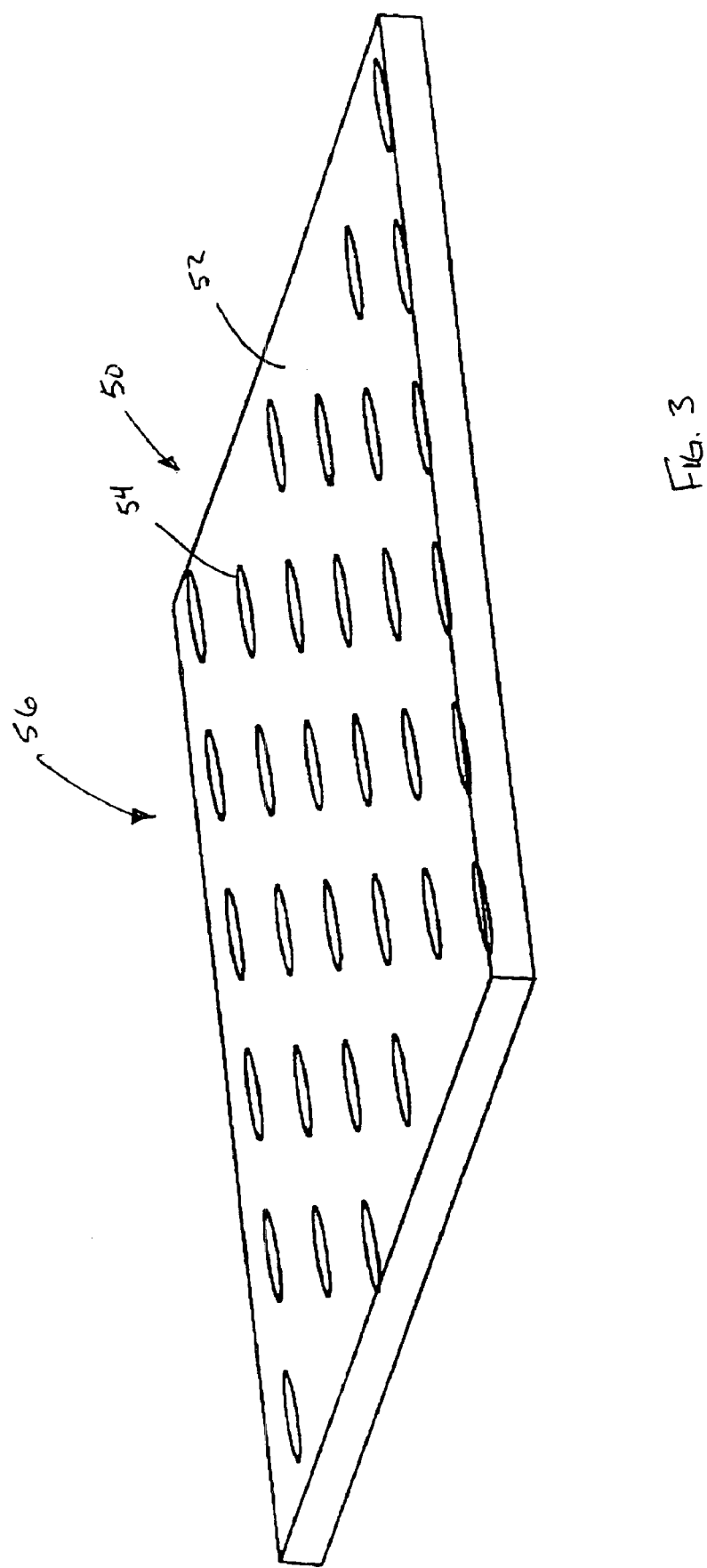

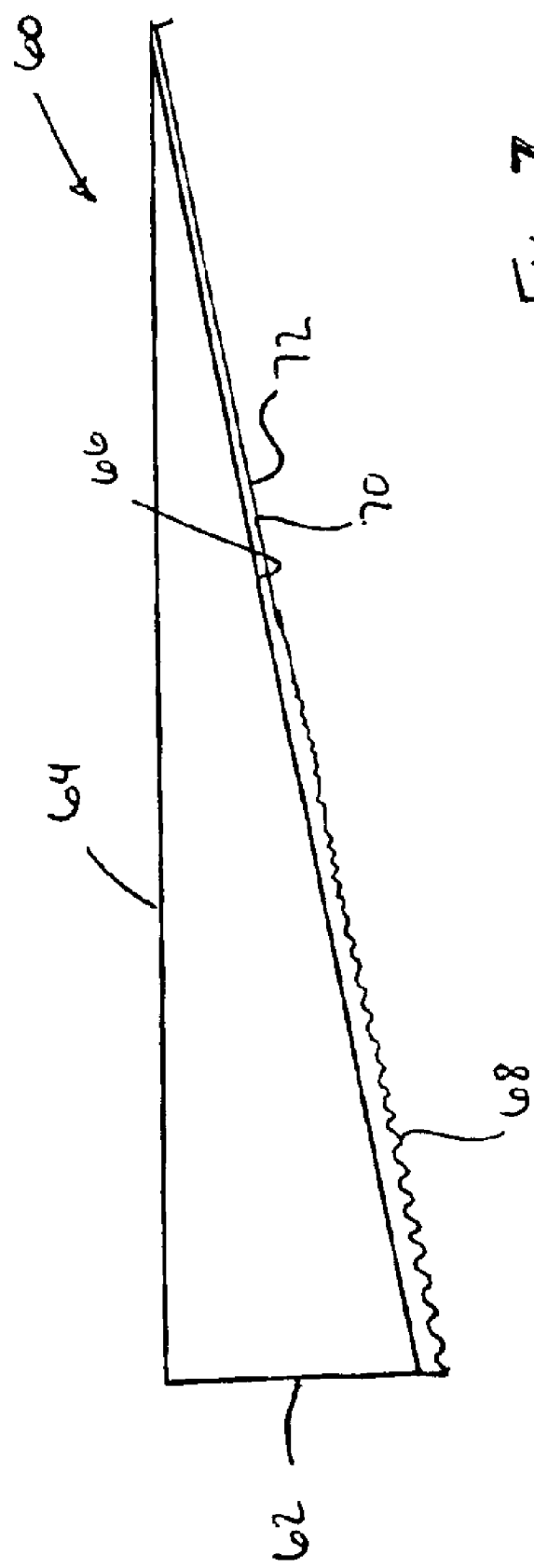

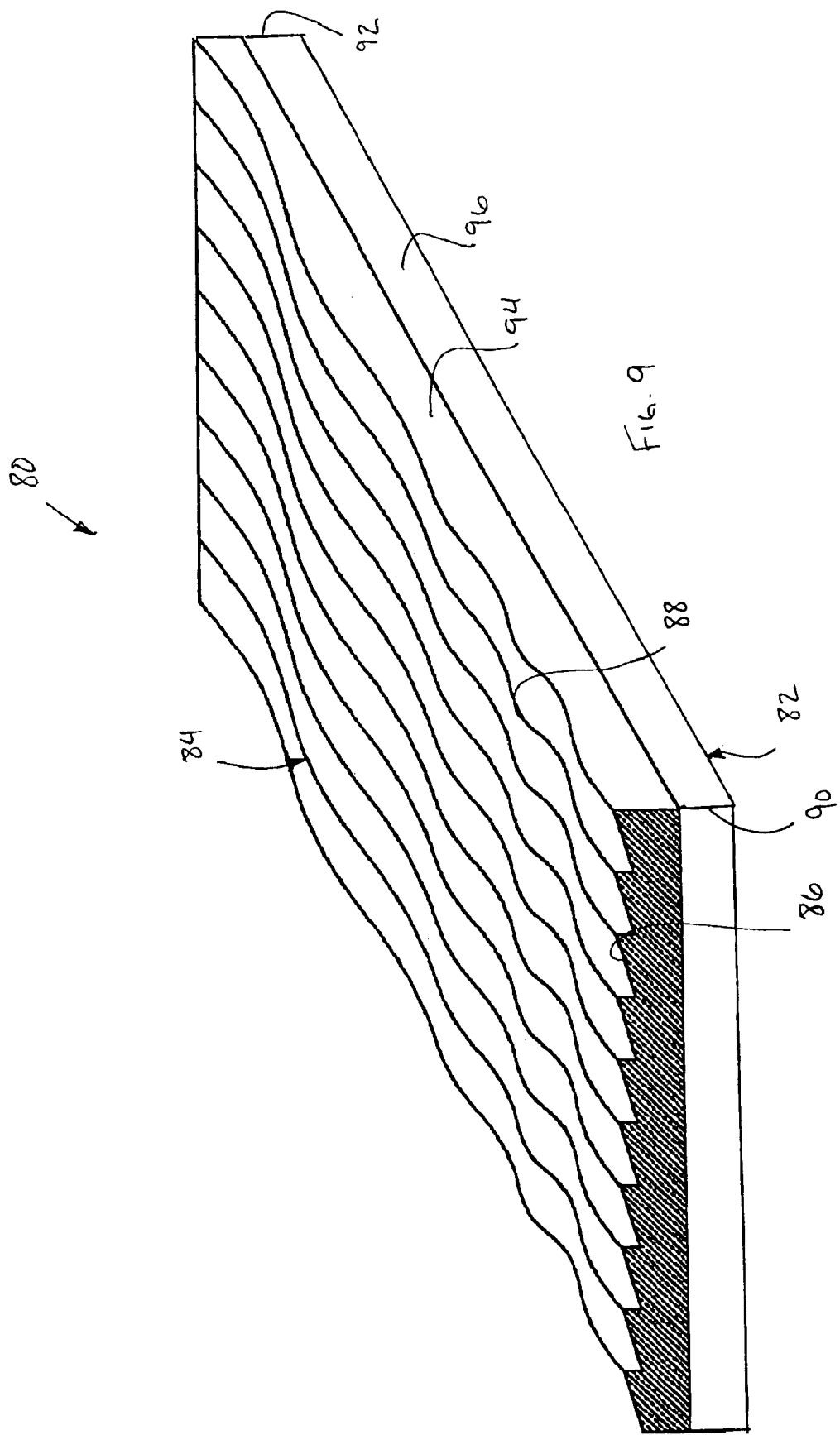

On-Axis Luminance 985 cd/m^2
Maximum Luminance 1262 cd/m^2
Integrated Intensity 488 lm/m^2
Horizontal Half-Angle 23.1°
Vertical Half-Angle 7.7°

On-Axis Luminance 1563 cd/m^2
Maximum Luminance 1771 cd/m^2
Integrated Intensity 493 lm/m^2
Horizontal Half-Angle 9.6°
Vertical Half-Angle 9.1°

BLACKLIGHT WITH STRUCTURED SURFACES

CROSS-REFERENCE TO RELATED APPLICATIONS

This application is a continuation-in-part of U.S. patent application Ser. No. 09/415,471, filed Oct. 8, 1999.

BACKGROUND OF THE INVENTION

1. Field of the Invention

The invention relates generally to a backlight and more particularly to backlights including lightguides formed with optical structures in one or more surfaces of the lightguide.

2. Description of the Related Technology

Backlit display devices, such as liquid crystal display (LCD) devices, commonly use a wedge-shaped lightguide. The wedge-shaped lightguide couples light from a substantially linear source, such as a cold cathode fluorescent lamp (CCFL), to a substantially planar output. The planar output is then used to illuminate the LCD.

One measure of the performance of the backlit display is its uniformity. A user can easily perceive relatively small differences in brightness of a display from one area of the display to the next. Even relatively small non-uniformities can be very annoying to a user of the display.

Surface diffusers or bulk diffuser sheets, which scatter the light exiting the lightguide, are sometimes used to mask or soften non-uniformities. However, this diffusion also results in light being directed away from a preferred viewing axis. A net result can be a reduction in overall brightness of the display along the preferred viewing axis, which is another performance measure of a display device.

From a subjective standpoint relatively small increases or decreases in overall brightness are not as easily perceived by the user of the display device as are discrete non-uniformities. However, the display device designer is discouraged by even the smallest decreases in overall brightness including decreases so small they might only be perceived by objective measurement. This is because display brightness and power requirements of the display are closely related. If overall brightness can be increased without increasing the required power, the designer can actually allocate less power to the display device, yet still achieve an acceptable level of brightness. For battery powered portable devices, this translates to longer running times.

SUMMARY OF THE INVENTION

In accordance with the invention, an optical element, such as a lightguide, optical film or lens, is formed with a predetermined, programmed pattern of optical structures. The optical structures may be arranged to selectively correct for non-uniformities in the output of the optical element, or may be arranged to otherwise effect the performance of the display in a predetermined, and designed manner.

In a first aspect of the invention, an optically transmissive film having a first surface and a second surface and a first edge and a second edge is formed with a plurality of optical structures formed in the first surface. The plurality of optical structures are arranged on the first surface in a predetermined pattern, and each optical structure has at least one characteristic selected from the group consisting of an amplitude, a period and an aspect ratio. Each characteristic has a first value for a first predetermined location on the film between the first edge and the second edge and the characteristic has a second value, different from the first value, for a second predetermined location on the film, different than the first predetermined location on the film, between the first edge and the second edge.

In another aspect of the invention, the structure in accordance with the invention is part of a thick optical element, such as for example, a lightguide wedge or slab. The structure is achieved on the thick element through injection molding, casting, compression molding, or by bonding a film with the structure to the thick optical element.

BRIEF DESCRIPTION OF THE DRAWINGS

The many advantages and features of the present invention will become apparent to one of ordinary skill in the art from the following detailed description of several preferred embodiments of the invention with reference to the attached drawings wherein like reference numerals refer to like elements throughout and in which:

FIG. 3 is a perspective view of an optical film incorporating a programmed pattern of optical structures in accordance with another embodiment of the invention;

FIG. 7 is a cross-section view taken along line 7—7 of FIG. 6;

FIG. 9 is perspective view of a linear lens structure incorporating a programmed pattern of optical structures in accordance with another embodiment of the invention;

DETAILED DESCRIPTION OF THE PREFERRED EMBODIMENTS

The present invention is described in terms of several preferred embodiments, and particularly, in terms of an optical film or a lightguide suitable for use in a backlighting system typically used in flat panel display devices, such as a laptop computer display or a desktop flat panel display. The invention, however, is not so limited in application and one of ordinary skill in the art will appreciate that it has application to virtually any optical system, for example, to projection screen devices and flat panel televisions. It will be further appreciated that the invention has application to small LCD display devices such as those found in cellular telephones, personal digital assistants (PDAs), pagers, and the like. Therefore, the embodiments described herein should not be taken as limiting of the broad scope of the invention.

Figure 1:
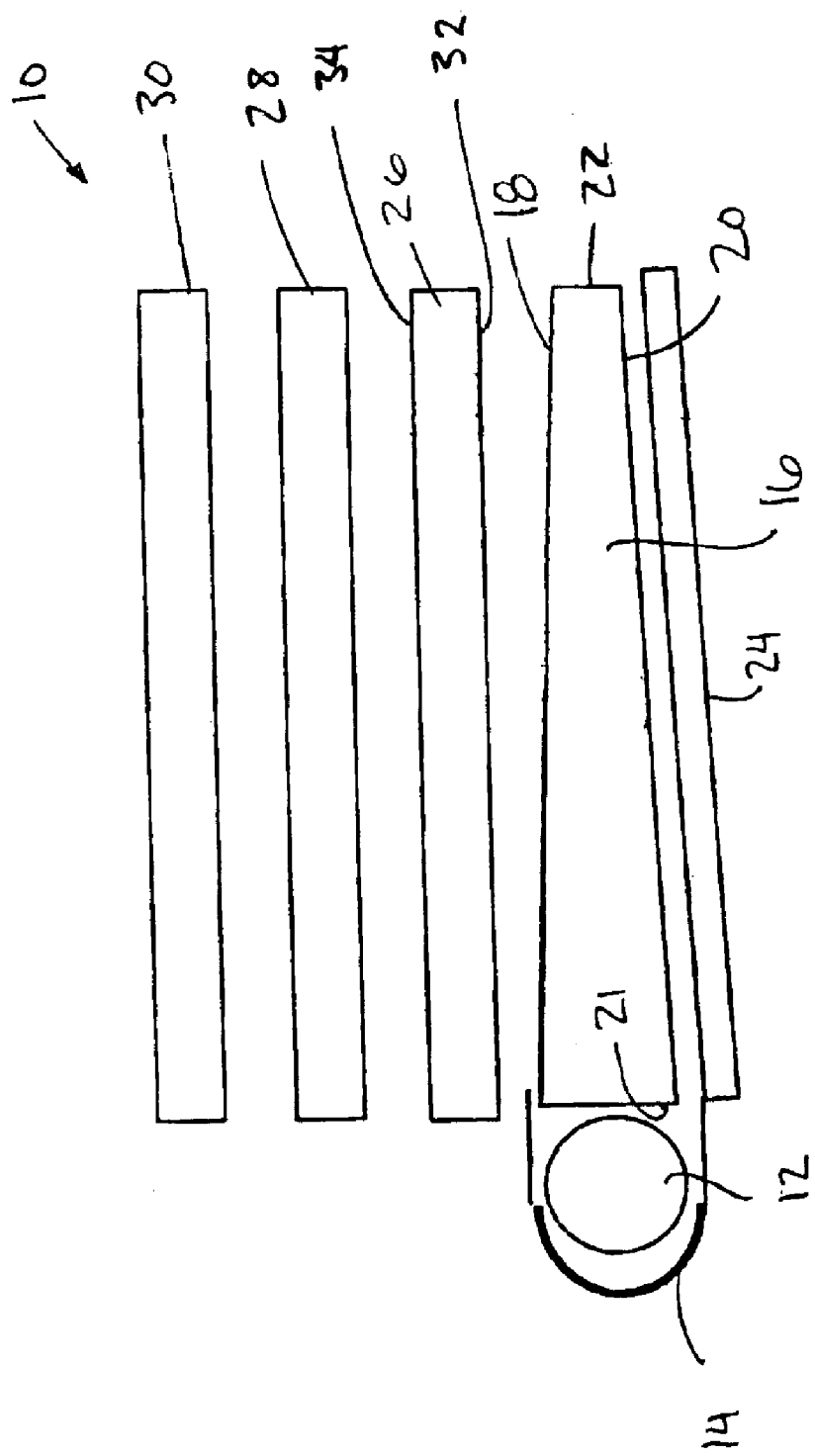
FIG. 1 is a perspective view of an illumination device adapted in accordance with an embodiment of the invention.

Referring to FIG. 1, an illumination system 10 includes a light source 12; a light source reflector 14; a lightguide 16 with an output surface 18, a back surface 20, an input surface 21 and an end surface 22; a reflector 24 adjacent the back surface 20; a first light redirecting element 26; a second light redirecting element 28; and a reflective polarizer 30. The lightguide 16 may be a wedge, a modification thereof or a slab. As is well known, the purpose of the lightguide is to provide for the distribution of light from the light source 12 over an area much larger than the light source 12, and more particularly, substantially over the entire area formed by the output surface 18. The lightguide 16 further preferably accomplishes these tasks in a compact, thin package.

The light source 12 may be a CCFL that inputs light to the edge surface 21 of the lightguide 16, and the lamp reflector 14 may be a reflective film that wraps around the light source 12 forming a lamp cavity. The back reflector 24 is located behind the lightguide 16 adjacent to the back surface 20. The back reflector 24 may be an efficient back reflector, e.g., a diffuse reflective film or a specular reflective film.

In the embodiment shown, the edge-coupled light propagates from the input surface 21 toward the end surface 22, confined by total internal reflection (TIR). The light is extracted from the lightguide 16 by frustration of the TIR. A ray confined within the lightguide 16 increases its angle of incidence relative to the plane of the top and bottom walls, due to the wedge angle, with each TIR bounce. Thus, the light eventually refracts out of the output surface 18 and at a glancing angle thereto, because it is no longer contained by TIR. Some of the light rays are extracted out of the back surface 20. These light rays are reflected back into and through the lightguide 16 by the back reflector 24. First light redirecting element 26 is arranged as a turning film to redirect these light rays exiting the output surface 18 along a direction substantially parallel to a preferred viewing direction.

Figure 2:
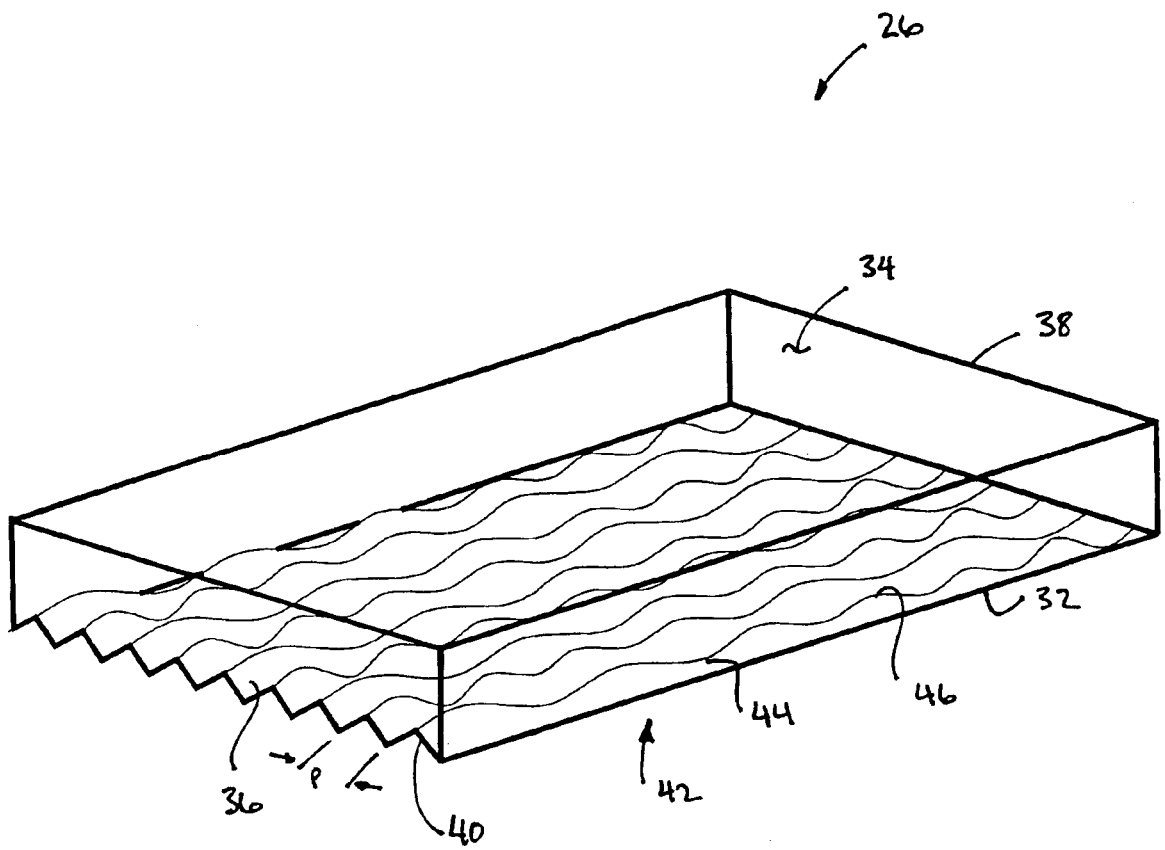
FIG. 2 is a perspective view of an optical film incorporating a programmed pattern of optical structures in accordance with one embodiment of the invention.

With reference still to FIG. 1 and with brief reference also to FIG. 2, the first light redirecting element 26 may be a light transmissive optical film with a first surface 32 and a second surface 34. The first surface 32, in a turning film application, is arranged as an input surface and is formed with prisms 44, which refract and reflect the light exiting the lightguide 16 along the preferred viewing direction. The second surface 34 is therefore an output surface. The prisms may have a substantially uniform configuration, or may have a non-uniform configuration as described in commonly assigned U.S. patent application "OPTICAL FILM WITH VARIABLE ANGLE PRISMS," Ser. No. 09/415,873, filed Oct. 8, 1999, the disclosure of which is hereby expressly incorporated herein by reference.

Referring back to FIG. 1, the second light redirecting element 28 may not be required in every configuration of the illumination system 10. When included in the system 10, the second light redirecting element may be a diffuser, a lenticular spreader or a prism film, for example a brightness enhancing film such as the 3M Brightness Enhancement film product (sold as BEFII or BEFIII) available from Minnesota Mining and Manufacturing Company, St. Paul, Minn. The reflective polarizer 30 may be an inorganic, polymeric or cholesteric liquid crystal polarizer film. A suitable film is the Diffuse Reflective Polarizer film product (sold as DRPF) or the Specular Reflective Polarizer film product (sold as DBEF), both of which are available from Minnesota Mining and Manufacturing Company. Furthermore, at least the second light redirecting element 28 and the reflective polarizer 30, and potentially the first light redirecting element 26, may be combined into a single optical element. The commonly assigned U.S. patent application entitled "DISPLAY ILLUMINATION DEVICE AND METHOD OF ENHANCING BRIGHTNESS IN A DISPLAY ILLUMINATION DEVICE," Ser. No. 09/415,100, filed Oct. 8, 1999, the disclosure of which is hereby expressly incorporated herein by reference, describes several such combined optical structures.

With lightguides used for backlighting, such as the lightguide 16, it is common for there to be non-uniformities in the light output from the lightguide. These non-uniformities can frequently be concentrated near the input surface 21. To mask non-uniformities, which are generally considered a defect, a diffuser that covers the output surface of the lightguide is typically used. However, a diffuser tends to reduce the overall brightness of the display and may not adequately mask all of the defects.

As described above, in the illumination system 10, the first light redirecting element 26 is arranged as a turning film, and may have a structure as shown in FIG. 2. Referring once again to FIG. 2, the film contains a pattern 42 of optical structures 40 (prisms) that are arranged to have an out-of-phase varying amplitude. For a turning film application, the pattern 42 is formed on a surface that is the light input surface of the film. However, in other applications several of which will be described herein, the pattern 42 may be formed on a top and/or bottom surface of a wedge, slab or film. For the turning film application illustrated in FIG. 1, in addition to the prisms formed on the first surface 32 of the first light redirecting element 26, the second surface 34 may be formed with optical structures.

Continuing with the discussion in connection with FIG. 2, the first light redirecting element 26 has a first edge 36 and a second edge 38. The optical structures 40 extend from the first edge 36 toward the second edge 38 in the pattern 42. Each optical structure 40 may have a number of characteristics, such as amplitude, period and aspect ratio of the peaks 44 and valleys 46. The pattern 42 may also have characteristics, such as for example, a pitch, p, between optical structures 40. The structures 40 in FIG. 2 are shown having amplitude variation. In application of the first light redirecting structure 26, the grooves may be arranged such that variation in their amplitude is perpendicular to the lightsource 12 (FIG. 1).

With continued reference to FIG. 2, it is observed that within the pattern 42, the optical structures 40 are formed with a larger amount of amplitude variation at the first edge 36, and this amplitude variation decreases in magnitude toward the second edge 38. The larger amount of amplitude variation in the optical structures 40 produces more optical power along the groove axis because of the higher surface slopes. The optical power of this pattern then decreases as a function of the distance from the first edge 36. This arrangement of the optical structures 40 and the pattern 42 is purposeful. As noted, non-uniformities in the output of lightguide 16 may be concentrated near the input surface 21 while there may be less non-uniformity farther from the input surface 21. Thus, the optical structures 40 and the pattern 42 are arranged to provide more diffusion near the first edge 36. In application, the first edge 36 will be disposed substantially adjacent the input surface 21 of the lightguide 16. The pattern 42 has a pitch, p, which may be uniform or variable, and the amplitude of the optical structures 40 may decrease to naught toward the second edge 38. This pattern, as will be discussed in more detail below, may be produced with any tool shape.

It should be appreciated that using ray tracing and other analysis techniques, it is possible to determine particular arrangements for the optical structures 40 and the pattern 42 that best correct particular observed non-uniformities in the output of the lightguide 16. That is, one or more of the characteristics of the optical structures 40 and the pattern 42 may be tailored to correct a particular non-uniformity. As described above, in connection with first light redirecting element 26, the optical structures 40 and the pattern 42 provided optical power to the output of the lightguide 16 near the input surface 21 in order to mask non-uniformities that may occur near the input surface 21. Less or no optical power is provided away from the input surface 21 as fewer or less intense non-uniformities are typically observed from the lightguide 16 farther from the input surface 21. In this manner, optical power is provided where most needed to mask or soften non-uniformities, while less optical power is provided where there may be less non-uniformity to mask. Moreover, optical power may be added virtually anywhere to the output of the lightguide by adding optical structures and/or varying the characteristics of the optical structures. Furthermore, the addition of optical power need not be uniform. Instead, optical power may be added, as necessary, to discrete regions of the lightguide output if necessary to help mask a defect or create a particular optical effect.

Some lightguides include a pattern of diffuse dots on a back surface of the lightguide. Light incident to one of the dots is diffusely scattered by the diffuse dot, and a portion of this reflected light is caused to exit the light guide. In spite of the diffuse nature of this method of extracting light from the lightguide, the pattern of dots may itself be visible in the lightguide output. Thus, to hide the dot pattern, additional diffusion is typically provided.

With reference to FIG. 3, a film 50 has a surface 52 which is formed to include a plurality of optical structures 54 disposed in a pattern 56. The optical structures 54 are arranged essentially to replace the diffuse dot pattern for providing extraction of light from the lightguide. While shown in FIG. 3 as ellipses, the optical structures 54 are not collectively limited to any particular shape nor are they limited to any one particular shape within the pattern 56. Therefore, the optical structures 54 may be prisms, lines, dots, squares, ellipses, circles, diamonds or generally any shape or combinations of shapes. Moreover, the optical structures 54 may be made very small in size and may be spaced very closely together within the pattern 56, much more so than the dots within a diffuse dot pattern may be size and spaced. For example, the optical structures may have a size up to the size typical of that used for diffuse dots, but preferably will be smaller than the acuity of the human eye, and may be spaced within about 50–100 μm of each other. This very small size and close spacing of the optical structures 54 eliminates or reduces the need for diffusion in the output of the lightguide that is ordinarily necessary to hide the pattern of diffuse dots.

Figure 5:
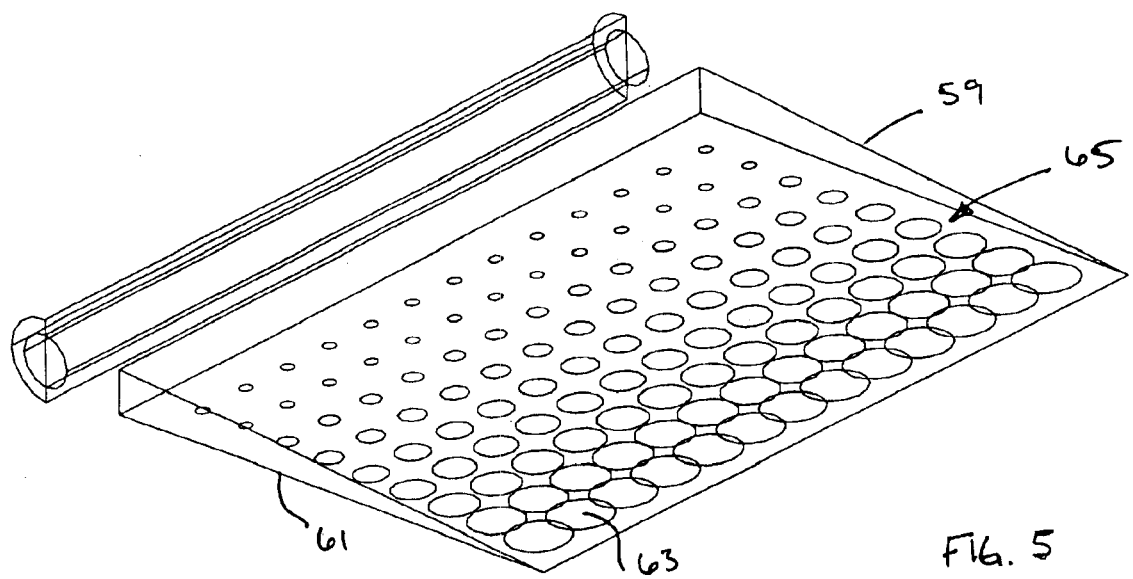
FIG. 5 is a perspective view of a lightguide wedge incorporating a programmed pattern of optical structures in accordance with another embodiment of the invention.
Figure 4:
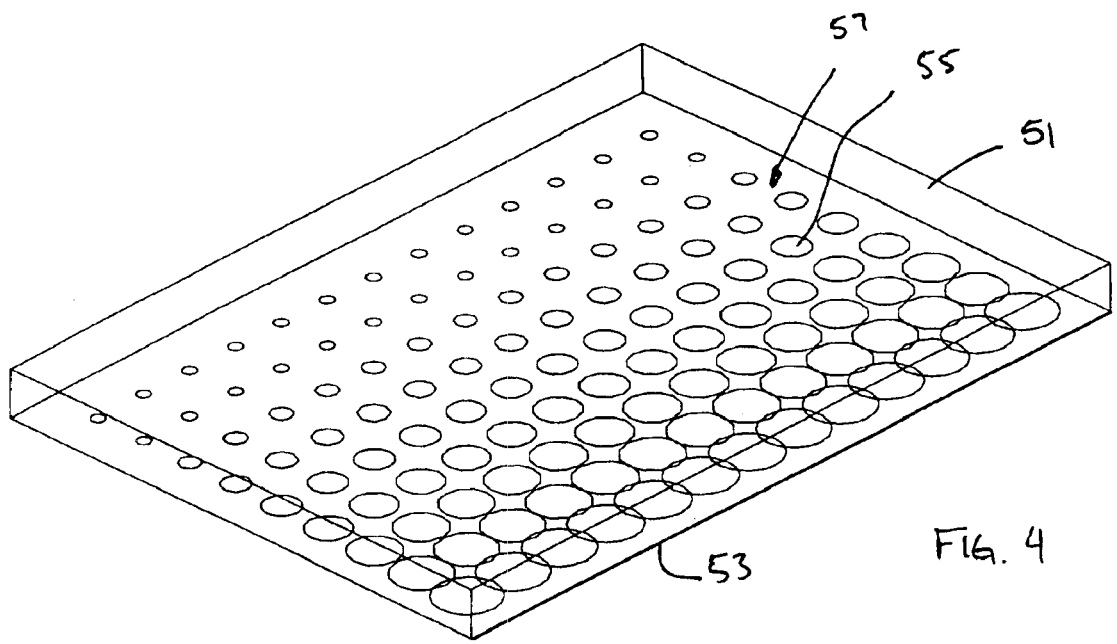
FIG. 4 is a perspective view of an optical film incorporating a programmed pattern of optical structures in accordance with another embodiment of the invention.

Referring to FIG. 4, an optical film 51 has a surface 53 which is formed with a plurality of optical structures 55 disposed in a pattern 57. In this embodiment of the invention, the optical structures 55 are formed as circles or dots. FIG. 5 illustrates a lightguide wedge 59 with a back surface 61 that is formed with optical structures 63 disposed in a pattern 65. The optical structures again are illustrated as circles or dots, but it will be appreciated that the optical structures may take on virtually any configuration.

The invention permits and provides for the changing of the slope of the lightguide at a micro-level. That is, the slope of the lightguide may be locally increased or decreased by the addition of optical structures at the micro-level. When a light ray hits a higher positive slope, it will be extracted from the lightguide faster than if it hit the nominal wedge angle.

Figure 6:
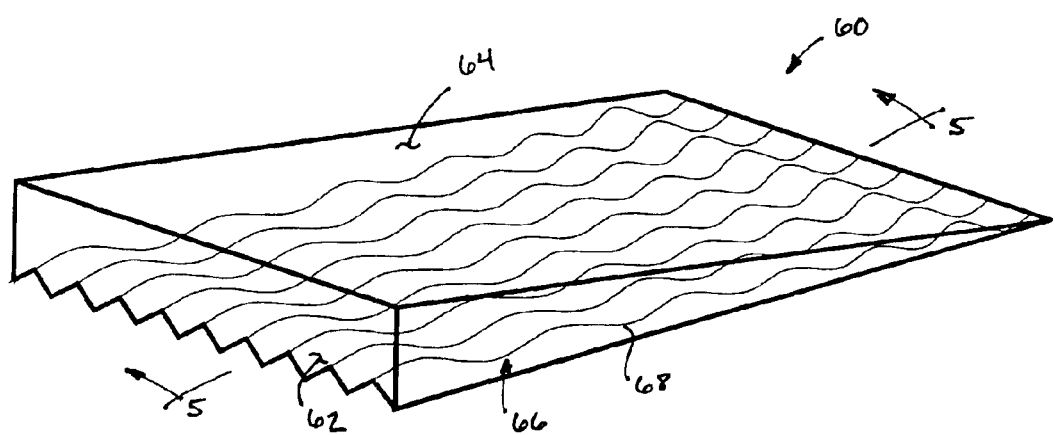
FIG. 6 is a perspective view of a lightguide wedge incorporating an in-phase programmed pattern of optical structures in accordance with another embodiment of the invention.

While so far discussed in terms of optical films, the invention has application to the lightguide wedge itself. Referring to FIGS. 6 and 7, a lightguide 60 has an input surface 62, an output surface 64 and a back surface 66. The input surface 62 is arranged to be disposed adjacent a light source (not depicted) to provide a source of light incident to the input surface 62. The light incident to the input surface 62 is extracted out of the output surface 64 as a result of frustrated TIR within the lightguide 60. As discussed above, it is common for there to be non-uniformities in the light output from the lightguide 60, particularly near the input surface 62.

Figure 8:
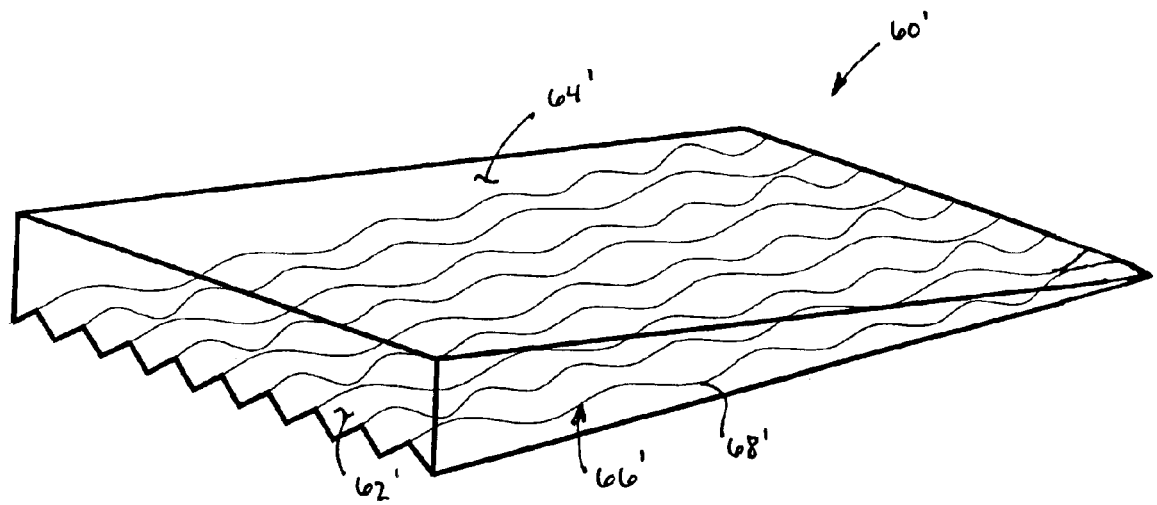
FIG. 8 is a perspective view of a lightguide wedge incorporating an out-of-phase programmed pattern of optical structures in accordance with another embodiment of the invention.

FIG. 7 illustrates the addition of optical power to the back surface 66 of the lightguide 60 and the adjustment in intensity extending away from the input surface 62. As shown in FIG. 6, the back surface 66 is formed with in-phase optical structures 68 arranged to enhance extraction near the input surface 62 and to taper to naught away from the input surface 62. The pattern can also be non-tapering, i.e., constant, over the entire surface, increasing from naught, randomly varying, or distributed in discrete regions. It is also possible for the optical structures to be out-of-phase, such as optical structures 68' formed in a back surface 66' of the lightguide 60' shown in FIG. 8. It will be appreciated that patterns of optical structures may also be formed in the output surface 64 either separately or in conjunction with a pattern formed in the back surface 66—such embodiments of the inventions being described more fully below and particularly in connection with FIGS. 15 and 16. Returning to the present discussion, a purpose of providing the optical structures is to achieve an effect that minimizes non-uniformities of the lightguide output wherever they may occur. For example, the lightguide 60 shown in FIGS. 6 and 8 may have non-uniformities that appear primarily adjacent the input surface 62, which would suggest adding optical structures that have more optical power near the input surface 62.

With particular reference to FIG. 7, the optical structures 68 may be formed on a surface 72 of an optical film 70. The optical film 70 may then be coupled to the wedge structure of the lightguide 60 using ultraviolet (UV) curing, pressure sensitive or any other suitable adhesive. Alternatively, the wedge may be molded in bulk to include the optical structures 68 in the back surface 66.

As will be more generally appreciated from the foregoing discussion, virtually any configuration of optical structures may be formed into an optical film, and the optical film coupled, for example by bonding, to a lightguide or other bulk optical element. For example, glare reduction, anti-wetout, Fresnels, and virtually any other structure that may be formed in a surface of an optical film may be easily replicated into the film and then the film coupled to another optical element.

Films incorporating programmed optical structures may be manufactured using a microreplication process. In such a manufacturing process, a master is made, for example by cutting the pattern into a metal roll, and the master is used to produce films by extrusion, cast-and-cure, embossing and other suitable processes. Alternatively, the films may be manufactured by compression or injection molding, casting or roll forming. A preferred apparatus and method for microreplication is described in the commonly assigned U.S. patent application entitled "Optical Film With Defect-Reducing Surface and Method of Making Same," Ser. No. 09/246,970 filed Feb. 9, 1999, the disclosure of which is hereby expressly incorporated herein by reference.

As an example of the above-described feature of the invention, and with reference to FIG. 9, a linear Fresnel lens or prism 80 has a substantially planar first surface 82 and a second surface 84. The second surface 84 is formed with lens structures 86 and superimposed on the lens structures 86 are additional optical structures 88. The optical structures 88 have characteristics, such as amplitude, period, and aspect ratio, which vary from a first edge 90 of the lens 80 to a second edge 92 of the lens 80. The lens 80 may be formed in bulk, or as shown in FIG. 9, the lens structures 86 including the optical structures 88 may be formed on a film 94 that is then bonded to a bulk optical substrate 96. Depending on the application, the first surface 82 may be arranged as an input surface and the second surface 84 as an output surface, and vice-versa.

Figure 10:
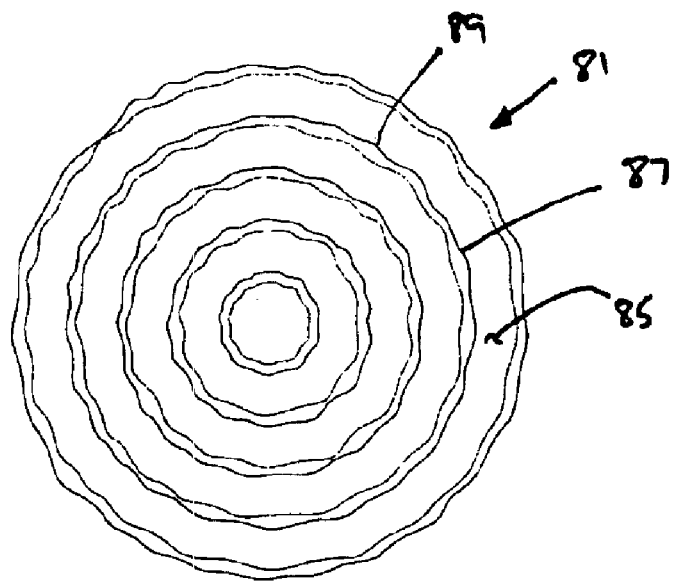
FIG. 10 is a schematic plan view representation of a circular lens structure incorporating a programmed pattern of optical structures in accordance with another embodiment of the invention.
Figure 11:
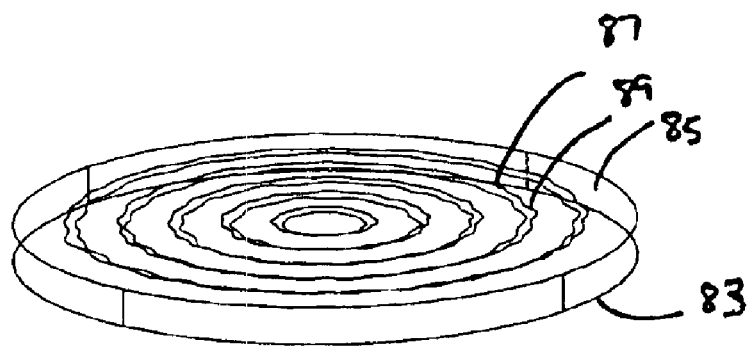
FIG. 11 is a schematic perspective view representation of the circular lens structure shown in FIG. 10.

FIGS. 10 and 11 illustrate schematically a circular lens 81 that includes a first surface 83 and a second surface 85. The second surface 85 is formed to include lens structures 87, for example, circular Fresnel lens structures, and superimposed over the lens structures 87 are additional optical structures 89. The optical structures 89 have characteristics, such as amplitude, period, and aspect ratio, which may vary, for example, from an outer circumference of the lens 81 to the center of the lens 81.

Figure 12:
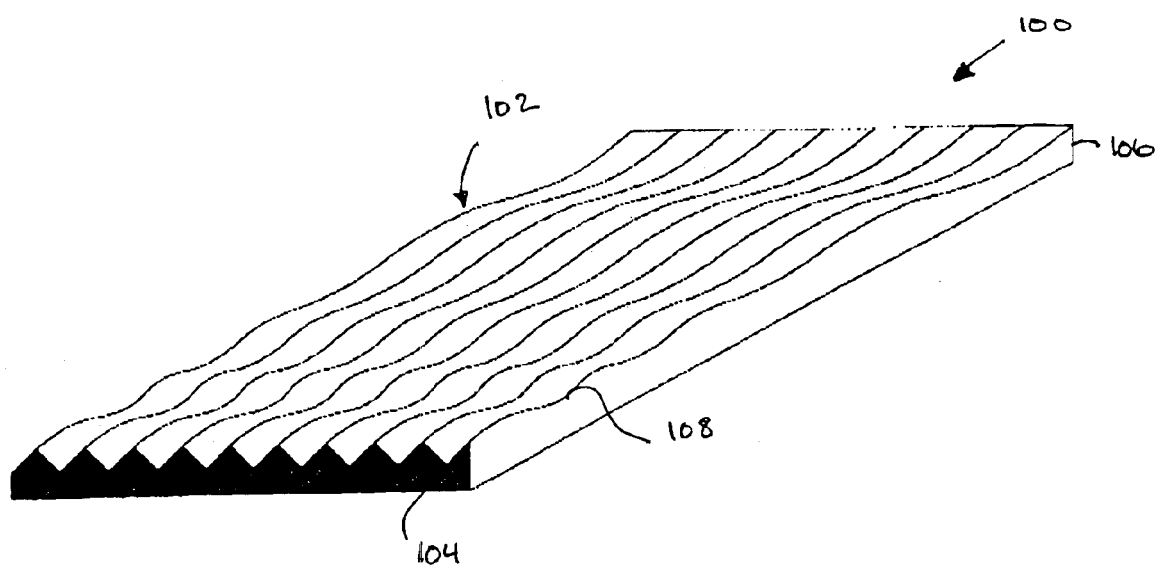
FIG. 12 is a perspective view of an optical film incorporating a programmed pattern of optical structures in accordance with an alternate preferred embodiment of the invention.

Referring now to FIG. 12, shown graphically is a film 100 containing a varying amplitude pattern 102 of optical structures 108 formed using a "V" shaped cutting tool. The pattern 102 may be formed on a top and/or bottom surface of the film 100. Likewise, the pattern 102 may be formed in a wedge or slab. The film 100 has a first edge 104 and a second edge 106. The optical structures 108 extend from the first edge 104 toward the second edge 106 arranged in the pattern 102. Each optical structure 108 may have a number of characteristics, such as amplitude, period and aspect ratio. The pattern 102 may also have characteristics, such as for example, a pitch, p, defining a spacing between optical structures 108. The optical structures 108 in FIG. 12 are shown having amplitude variation. In application of the film 100, the grooves may be arranged such that the variation in amplitude is perpendicular, parallel or at an angle to a lightsource of the lightguide incorporating the film 100.

With continued reference to FIG. 12, it is observed that within the pattern 102, the optical structures 108 are formed with larger amplitude at the first edge 104 and decrease in amplitude toward the second edge 106. The larger amplitude produces more optical power along the groove axis because of the higher surface slopes. The optical power of this pattern then decreases as a function of the distance from the first edge 104. This arrangement of the optical structures 108 and the pattern 102 is purposeful.

Figure 13:
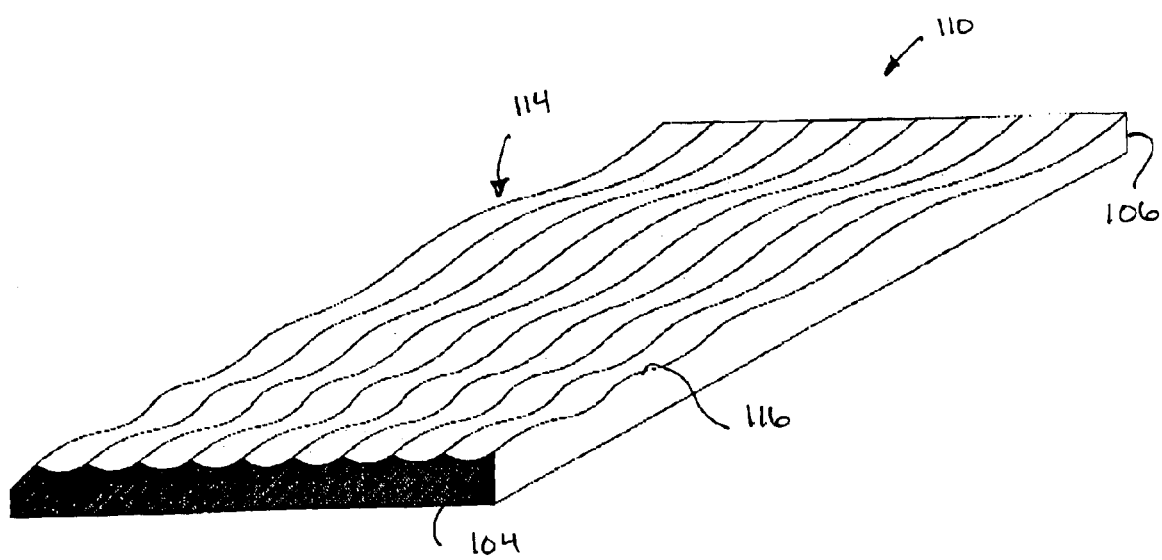
FIG. 13 is a perspective view of an optical film incorporating a programmed pattern of optical structures in accordance with an alternate preferred embodiment of the invention.
Figure 14:
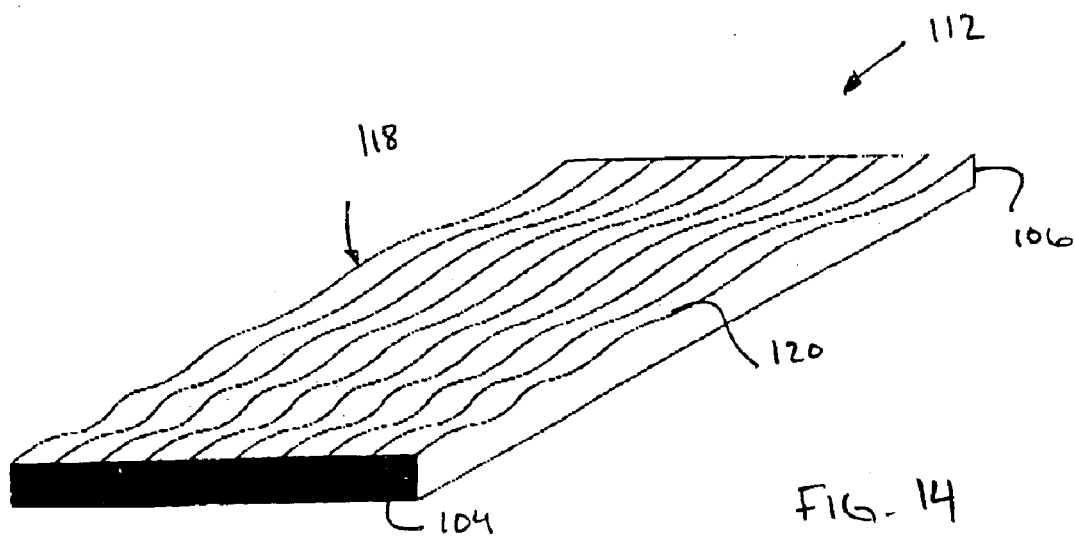
FIG. 14 is a perspective view of an optical film incorporating a programmed pattern of optical structures in accordance with an alternate preferred embodiment of the invention.

With reference to FIGS. 13 and 14, films 110 and 112, are shown respectively. Each film 110 and 112 has characteristics like film 100, and like reference numerals are used to describe like elements therebetween. As opposed to the pattern created by using a "V" shaped tool, the film 110, FIG. 13, has a pattern 114 of optical structure 116 that is formed using a tool having a curve or arc configuration. The film 112, FIG. 14, has a pattern 118 of optical structures 120 that is formed using a flat nose tool. The patterns 114 and 118 are arranged as described to provide optical power in the surface or surfaces of the films 110 and 112. It will be appreciated that virtually any tool configuration may be used with the particular tool being selected to achieve a desired amount and form of optical power in the surface or surfaces of the film.

Figure 16:
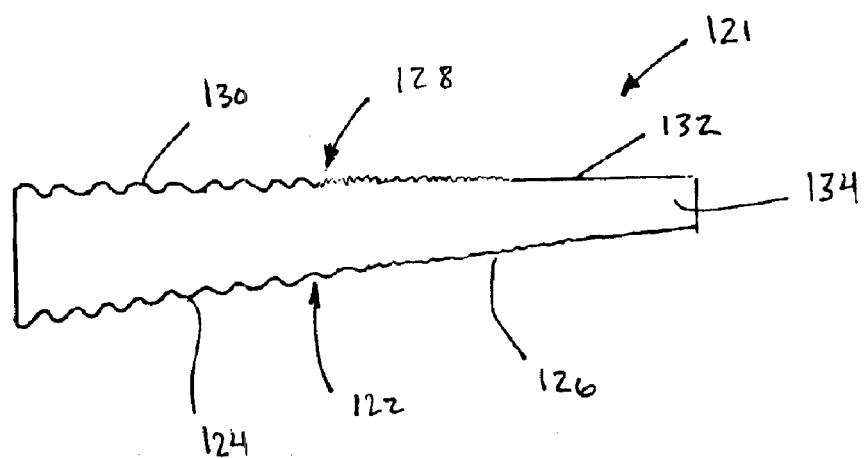
FIG. 16 is a side view illustration of the lightguide shown in FIG. 15.
Figure 15:
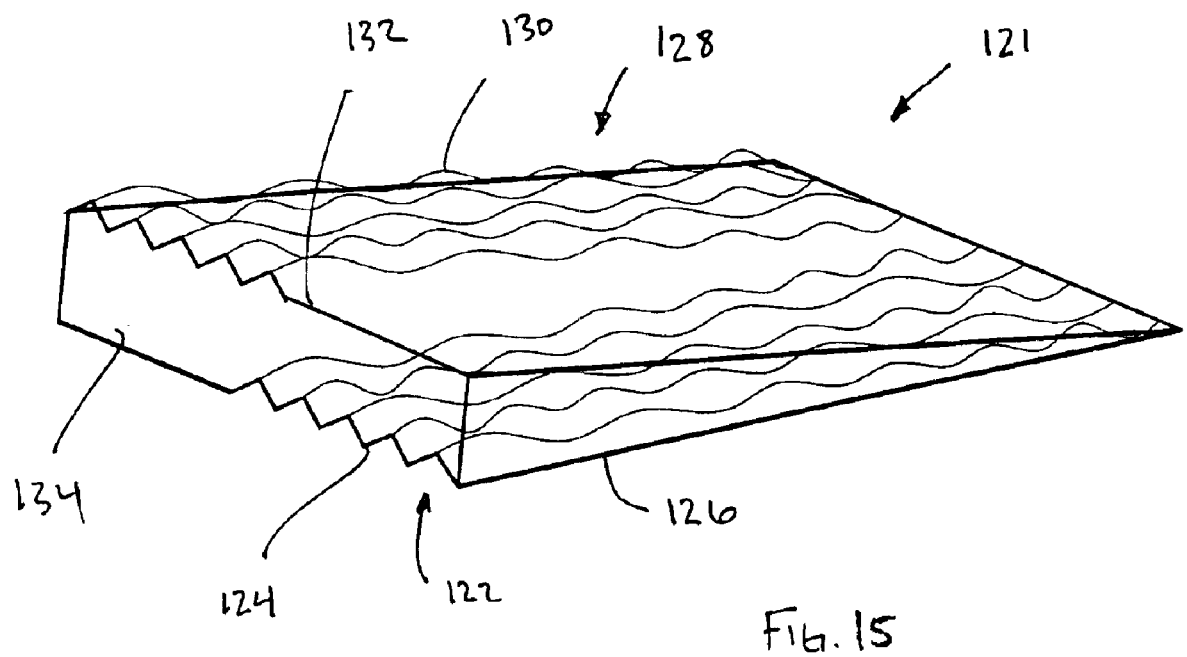
FIG. 15 is a perspective view of a lightguide incorporating a first programmed pattern of optical structures in a top surface and a second programmed pattern of optical structures in a bottom surface in accordance with a preferred embodiment of the invention.

In the lightguide 121 illustrated in FIGS. 15 and 16, a first pattern 122 of optical structures 124 is formed in a bottom surface 126 and a second pattern 128 of optical structures 130 is formed in a top surface 132 of the wedge 134. For purposes of illustration only, the optical structures 124 are shown in FIG. 15 to extend only partially across the bottom surface 126, and the optical structures 130 are shown in FIG. 15 to extend only partially across the top surface 132. It will be appreciated that the optical structures 124 and the optical structures 130 will in most cases extend across the entirety of the bottom surface 126 and the top surface 132, respectively. The first pattern 122 may be arranged to facilitate the extraction of light from the wedge 134, while the second pattern 128 may be arranged to mask non-uniformities in the light output from the wedge. It will be appreciated, however, that the patterns implemented in the wedge 134 will depend on the desired light output to be achieved from the wedge 134. Moreover, as described above, the patterns 122 and 128 may be formed first in optical films that are later coupled to the wedge, for example, by bonding. In another construction, surfaces 122 and 128 are formed in the wedge by injection molding or casting.

As is appreciated from the foregoing discussion, and in accordance with the preferred embodiments of the invention, a lightguide may be formed with optical structures, e.g., "V" grooves, in either a first surface, a second surface or both. Whether the first surface or the second surface is an input surface relates to the orientation of the surface with respect to a light source. The optical structures may be uniformly or randomly spaced, and may have various other characteristics. Thus, the invention has application to lightguides and backlight systems for a variety of applications. One example of an application is a backlight system that extracts light by the frustration of total internal reflection where the lightguide is formed with optical structures in either a back surface and/or an output surface thereof. Still another example is a backlight system that has a lightguide that uses a pattern of dots to extract light ad includes optical structures formed in either or both of its back and output surfaces. These and other examples are described in more detail below.

Figure 17:
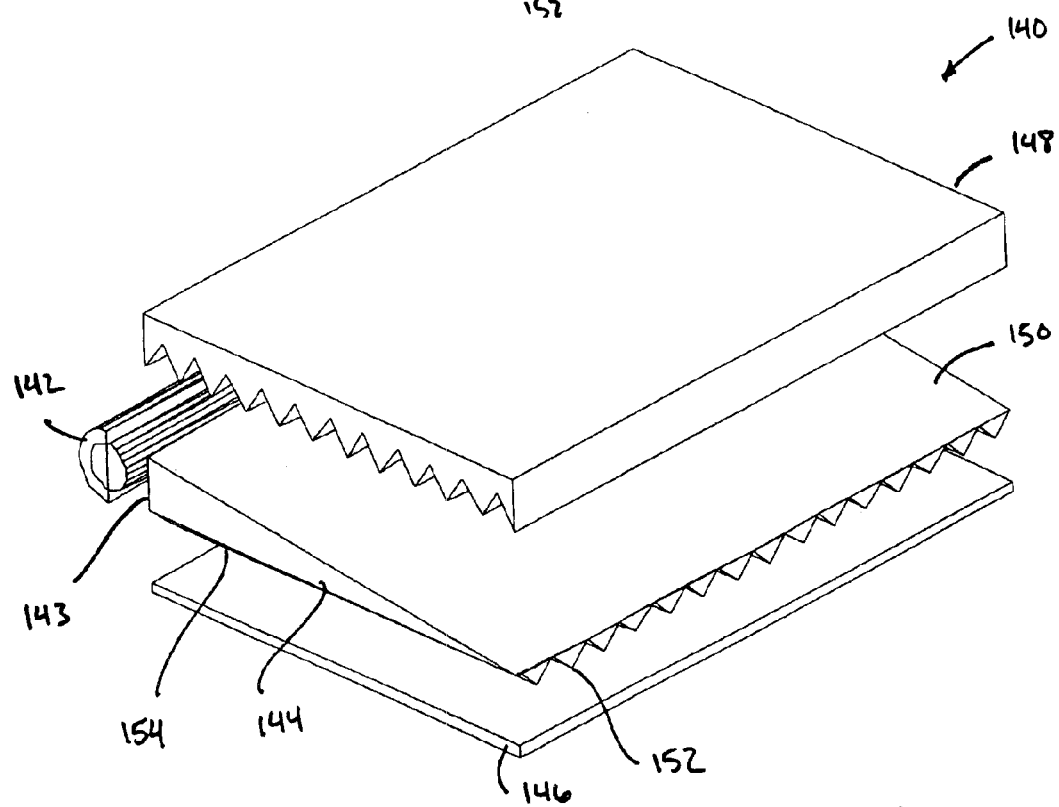
FIG. 17 is an exploded perspective view of a backlight in accordance with a preferred embodiment of the invention.

Referring to FIG. 17, a backlight 140 is illustrated and includes a light source 142 adjacent an input edge 143 of a wedge lightguide 144. A back reflector 146 is disposed adjacent a back surface 154 of the lightguide 144, and a turning film 148 is disposed adjacent an output surface 150 of the lightguide 144. The back surface 154 is formed with optical structures 152. The optical structures 152 may be grooves formed in the back surface 154, and are shown as such in FIG. 16. The grooves shown in FIG. 17 are "V" grooves and have a prism angle of about 90 degrees, but prism angles ranging from 60 degrees–120 degrees may be used. Shapes other than "V" grooves may also be used for optical structures 152. Furthermore, each optical structure may be formed to have a height that varies along its length from a nominal value. This variation may have a wavelength, which may be in the range of about 1 μm–1000 μm, preferably be less than about 140 μm. Such structures are disclosed and described in the commonly assigned U.S. patent application entitled "Optical Film," Ser. No. 09/025,183, filed Feb. 18, 1998, the disclosure of which is hereby expressly incorporated herein by reference.

The optical structures 152 are shown oriented substantially perpendicular to the light source 142. It will be appreciated that the optical structures 152 may be oriented parallel to the light source 142 or at an angle between 0 degrees–90 degrees to the light source 142.

The turning film 148 may be any suitable prismatic turning film. For example, the turning film 148 may be formed as described in the aforementioned U.S. Patent Application entitled "Optical Film With Variable Angle Prisms."

The back surface 154 is formed to include the optical structures 152. This results in some additional light being extracted from the lightguide 144 through the output surface 150 as compared to the light that is extracted from the back surface 154. A portion of the light exiting the back surface 154 will encounter the back reflector 146 and will be reflected back through the lightguide 144 and the output surface 150.

Figure 18:
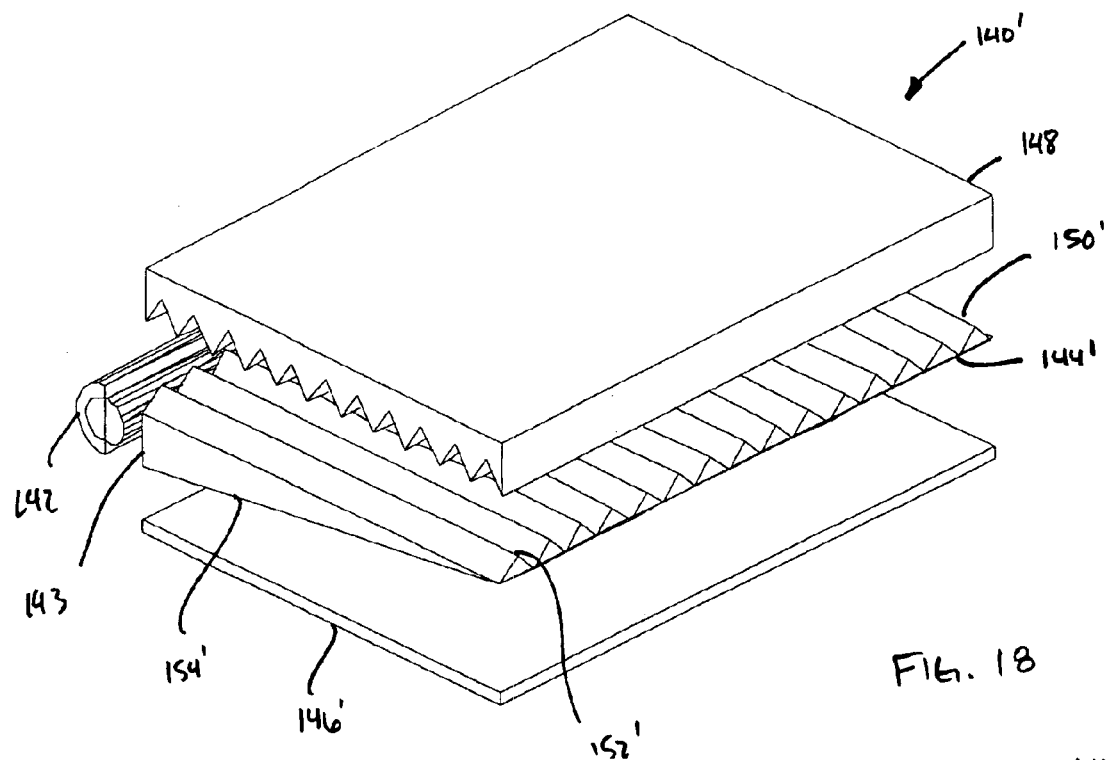
FIG. 18 is an exploded perspective view of a backlight in accordance with a preferred embodiment of the invention.

Referring now to FIG. 18, a backlight 140' is illustrated that is similar in construction to the backlight 140, and like reference numerals are used to designate like elements. Primed reference numerals are used to designate elements that are altered from the backlight construction shown in FIG. 17. The backlight 140' includes a light source 142 adjacent an input edge 143 of a wedge lightguide 144'. A back reflector 146' is disposed adjacent a back surface 154' of the lightguide 144', and a turning film 148 is disposed adjacent an output surface 150' of the lightguide 144'. The output surface 150' is formed with optical structures 152'. The optical structures 152' may be grooves formed in the output surface 150', and are shown as such in FIG. 17. The grooves shown in FIG. 18 are "V" grooves and have a prism angle of about 90 degrees, but prism angles ranging from 60 degrees–120 degrees may be used. Shapes other than "V" grooves may also be used for optical structures 152'. Furthermore, each optical structure 152' may be formed to have a height that varies along its length from a nominal value. This variation in height may have a wavelength, which may be in the range of about 1 μm–1000 μm, but for lightguide applications will preferably be less than about 140 μm. Such structures are disclosed and described in the aforementioned U.S. patent application entitled "Optical Film," Ser. No. 09/025,183.

The optical structures 152' are shown oriented substantially perpendicular to the light source 142'. It will be appreciated that the optical structures 152' may be oriented parallel to the light source 142' or at an angle between 0 degrees–90 degrees to the light source 142.

Forming the output surface 150' to include the optical structures 152' results in additional light being extracted from the lightguide 144 through the back surface 154' as compared to the output surface 150'. Some light is also extracted from the output surface 150'. The portion of the light exiting the back surface 154' will encounter the back reflector 146' and will be reflected back through the lightguide 144' and the output surface 150. Therefore, with the backlight 140', it may be desirable to directly secure the back reflector 146' to the back surface 154'. This may be accomplished by laminating the back reflector 146' to the back surface 154'. Such an arrangement for the back reflector 146' is disclosed and described in the commonly assigned U.S. patent application Ser. No. 09/414,124, filed Oct. 8, 1999 and entitled "Lightguide Having a Directly Secured Reflector and a Method of Making the Same," the disclosure of which is expressly incorporated herein by reference. Alternatively, the back reflector may be formed on the back surface using a vapor deposition process. In embodiments in which the reflector is directly secured to the back surface of the lightguide, it will be appreciated that the reflector should be both specular and highly efficient with very low absorption.

As described above, variation is added to a characteristic of the optical structures 152 and 152' formed respectively in the back surface or the output surface of the lightguide, e.g., variation in the amplitude of the optical structures, to reduce non-uniformities in the output of the backlight 140 and 140', respectively. It is possible to provide similar variation in the optical structures by other methods, such as by bead blasting the optical structures, however forming the grooves with the described variation in prism height provides a controllable, predictable and hence preferred method of reducing non-uniformities in the output of the backlight.

Figure 19:
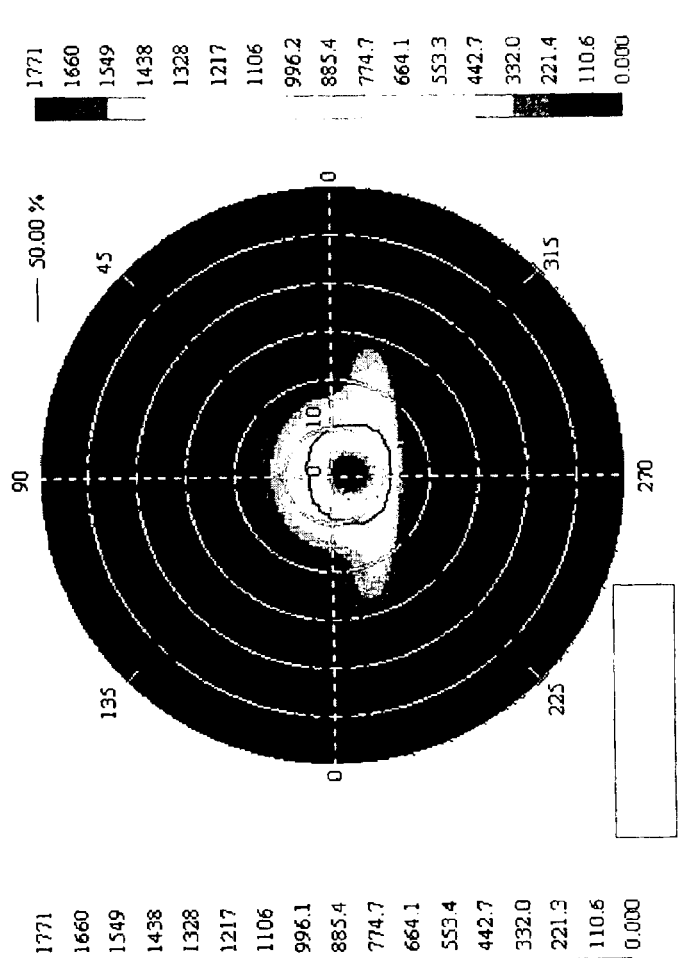
FIG. 19 is a plot illustrating light output distribution for the backlight illustrated in FIG. 17.
Figure 20:
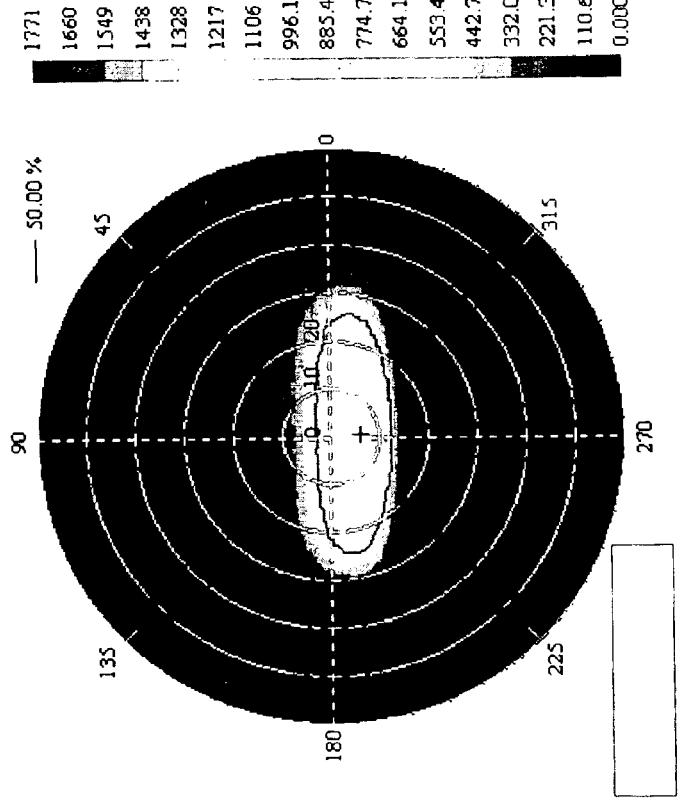
FIG. 20 is a plot illustrating light output distribution for the backlight illustrated in FIG. 18.

FIG. 19 illustrates light output in a viewing cone disposed above an output of the backlight 140, i.e., the light exiting the backlight 140 from an output surface of the turning film 148. What may be determined from the illustrated light output is the on-axis luminance, the maximum luminance, the integrated intensity, the horizontal distribution or horizontal half-angle and the vertical distribution or vertical half-angle. FIG. 20 provides a similar distribution for the backlight 140'. Clearly noticeable is that the output of backlight 140' has a reduced horizontal distribution and a slightly increased vertical distribution. Overall integrated intensity, or the total amount output light from the backlight 140 and 140' is about the same, although on-axis luminance and maximum luminance is substantially increased for the backlight 140' as compared to the backlight 140. Appreciated from the FIGS. 19 and 20, is that the arrangement of optical structures in the lightguides 140 and 140', respectively, will have an effect on the output of the backlight system. In the backlight 140', the lightguide 144' with optical structures 152' formed in its top surface, additional collimation of the light output of the backlight 140' is achieved as compared to the backlight 140. Furthermore, because optical structures 152' may be formed with varying characteristics, as described above, the light output from the backlight 140' may be made uniform without additional optical films or other devices, such as diffusers.

There are additional advantages associated with providing the optical structures 152', including varying characteristics, in the output surface 150' of the lightguide 140'. One such advantage relates to the interface of the output surface 150' with the turning film 148. With the optical structures 152' being formed in the output surface 150', there will be relatively few points of contact between the prisms of the turning film 148 and the output surface 150'. This may result in a decrease in the optical defect generally referred to as wet-out. As mentioned above, providing variation in the formation of the optical structures 152' helps also to mask defects in the output of the backlight making the light output more uniform. Therefore another advantage of providing the optical structures 152' in the output surface 150' may be the elimination of a diffuser film in the overall backlight system. Because the optical structures 152' provide light collimation, as may be observed from FIG. 20, it is possible, in accordance with the invention, to provide a backlight system that requires fewer sheets of optical film as compared to typical backlight systems.

Figure 21:
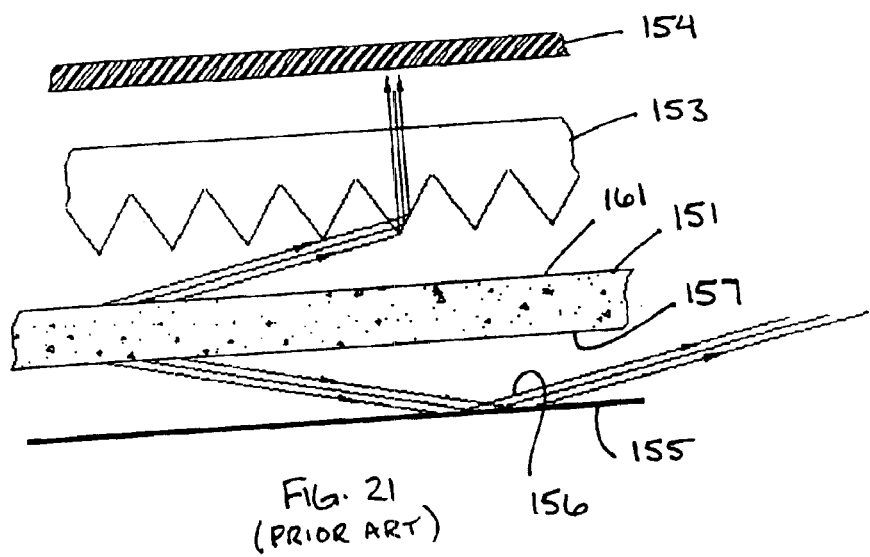
FIG. 21 is a side view illustration of a backlight in accordance with the prior art.
Figure 22:
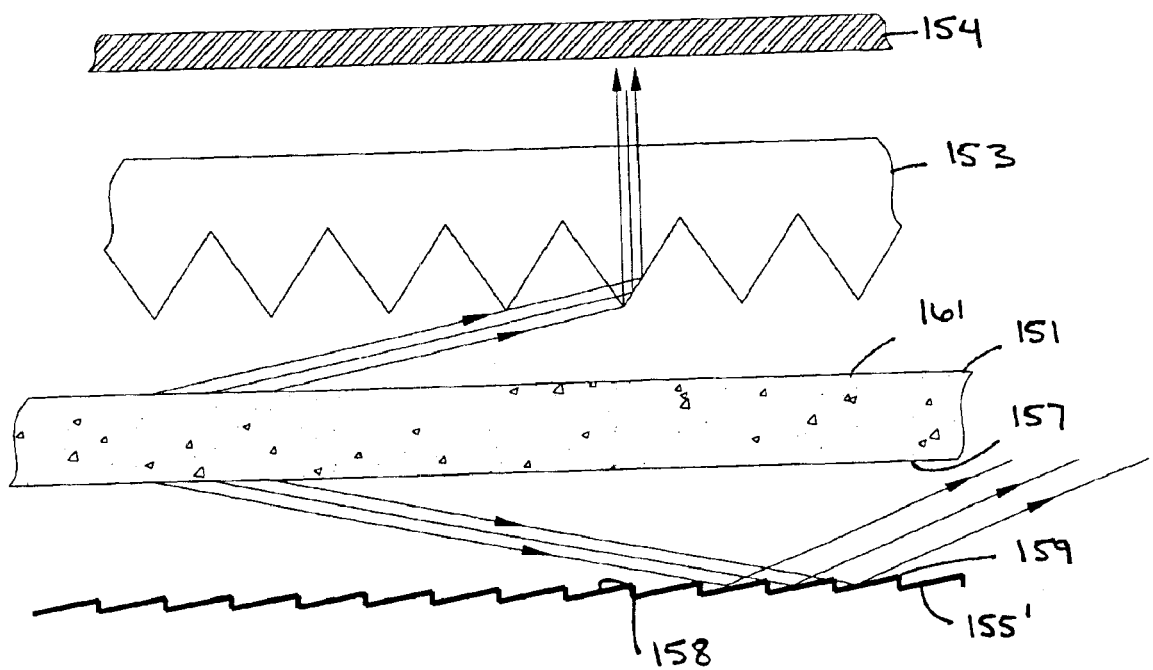
FIG. 22 is a side view illustration of a backlight in accordance with a preferred embodiment of the invention.

Illustrated in FIG. 21, are a lightguide 151, a turning film 153, an LCD display 154 and a back reflector 155. Light is extracted from the lightguide 151 from both the top surface 161 and the back surface 157. It is possible that strong Fresnel reflections 156 between the back reflector 155 and the back surface 157 may trap a substantial portion of the light extracted from the back surface 157. This light is ultimately lost leading to inefficiency. To improve this situation, illustrated in FIG. 22, the reflecting surface 158 of the back reflector 155' may be formed with optical structures 159. The optical structures 159 may be facets, grooves or other shaped structures. The optical structures 159 help to reduce the specular component of reflection from back reflector 155' and to direct more light up through the lightguide 151, thus increasing its efficiency. A suitable back reflector including optical structures is the enhanced diffuse reflector (EDR) film product sold by 3M. One of skill in the art will appreciate that the principle taught in FIG. 22 may be applied to virtually any backlight, including without limitation backlight 140 and backlight systems in accordance with the additional preferred embodiments herein described.

Several adaptations, enhancements and modifications of the backlight systems have been described above. Still others can be appreciated and are within the scope of the invention. It will be appreciated that the particular arrangement of the backlight system will depend on the application for which it is intended. To illustrate the adaptability of the present invention, several examples are shown and described in connection with FIGS. 23–28.

Grooves in the Back Surface of the Lightguide

Figure 23:
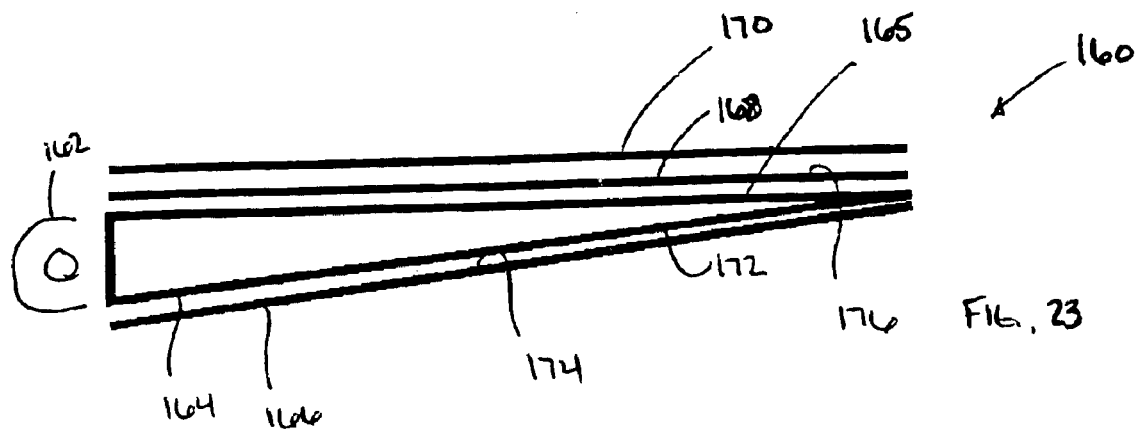
FIGS. 23–28 are side view illustrations of various configurations of backlights in accordance with the preferred embodiments of the invention.

In FIG. 23, a backlight 160 includes a light source 162, a wedge lightguide 164, a back reflector 166, a turning film 168 and an optional additional optical film 170. The lightguide 164 has an output surface 165 and a back surface 172 that is formed with optical structures similar to optical structures 152 shown in connection with the lightguide 144 in FIG. 16. The optical structures may be formed directly into the lightguide 164 by injection molding or casting. Alternatively, the optical structures may be formed in a light transmissive film that is laminated to the back surface 172 of the lightguide 164.

With optical structures formed on the back surface 172 of the lightguide 164 additional light exits the lightguide 164 through the output surface 165 as compared to the back surface 172. The light exiting the back surface 172, however, encounters the back reflector 166, and is reflected back through the lightguide 164. A suitable reflector including optical structures is a grooved diffuse reflector.

In accordance with additional aspects of the backlight 160, the turning film 168 may be formed to include a diffusive structure in its output surface 176. The optional optical film 170 may be a brightness enhancing film, such as aforementioned BEFIII optical film, the Diffuse Reflective Polarizer film product (sold as DRPF) or the Specular Reflective Polarizer film product (sold as DBEF), all of which are available from Minnesota Mining and Manufacturing Company.

Grooves in the Output Surface of the Lightguide

Figure 24:
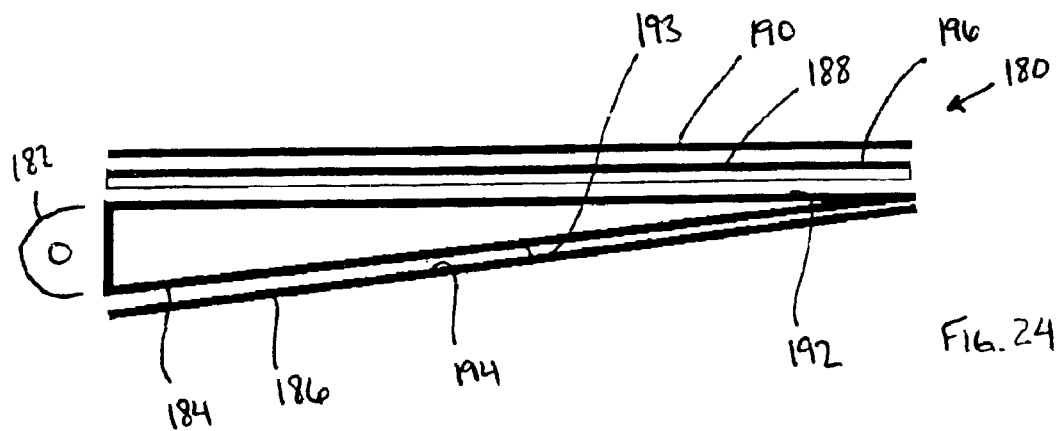

In FIG. 24, a backlight 180 includes a light source 182, a wedge lightguide 184, a back reflector 186, a turning film 188 and an optional optical film 190. The lightguide 184 has an output surface 192 that is formed with optical structures similar to optical structures 152' shown in connection with the lightguide 144' illustrated in FIG. 17. The lightguide 184 may be formed by injection molding or casting so as to include the optical structures in the output surface 192. Alternatively, the optical structures may be formed in a light transmissive film that is laminated to the output surface 192 of the lightguide 184. Such an arrangement potentially increases manufacturing flexibility and reduces manufacturing costs by simplifying mold design for the lightguide 184. Instead of having a unique mold for each lightguide, lightguides may be adapted in accordance with the invention by laminating a surface of the lightguide with the optical film formed with the optical structures.

With optical structures formed on the output surface 192 of the lightguide 184 an additional amount of light exits the lightguide 184 from the output surface 192 as compared to the amount of light exiting the lightguide from a back surface 193. The light exiting the back surface 193, however, encounters the surface 194 of the back reflector 186, and is reflected back through the lightguide 184. To ensure a high percentage of the light exiting the back surface 193 is reflected back through the lightguide 184, the back reflector 186 is preferably directly secured to the back surface 193. This may be accomplished by laminating a mirror or mirror film to the back surface 193 or by vapor deposition coating the back surface 193. When directly secured to the back surface 193, the back reflector should be specular and highly efficient.

In accordance with additional aspects of the backlight 180, the turning film 188 may be formed to include a diffusive structure in its output surface 196. The optical film 190 may be a brightness enhancing film, such as aforementioned BEFIII optical film, the Diffuse Reflective Polarizer film product (sold as DRPF) or the Specular Reflective Polarizer film product (sold as DBEF), all of which are available from Minnesota Mining and Manufacturing Company.

Figure 25:
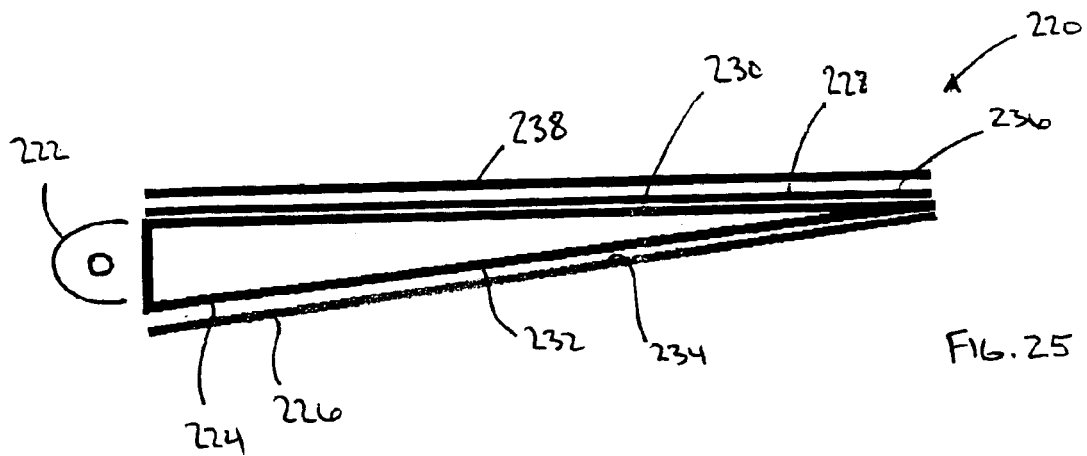

In FIG. 25, a backlight 220 includes a light source 222, a wedge lightguide 224, a back reflector 226 having a surface 234 and a turning film 228 having a surface 236. The lightguide 224 has an output surface 230 that is formed with optical structures (not depicted). The optical structures may have a varying pattern, such as described in the aforementioned United States Patent Application entitled "Optical Film," formed using a cutting tool of any suitable shape. The optical structures may be formed directly in the lightguide 224 by injection molding or casting, or alternatively, the optical structures may be formed in a light transmissive film that is laminated to the output surface 230 of the lightguide 224.

With optical structures formed on the output surface 230 of the lightguide 224 an additional amount of light exits the lightguide 224 through the back surface 232 as compared to the amount of light that exits through the output surface 230. This light encounters the surface 234 of the back reflector 226, and is reflected back through the lightguide 224. A suitable reflector may be a grooved diffuse reflector. The optical structures may also provide for masking of non-uniformities, and thus eliminate the need for a diffuser in the backlight system.

Also, because the optical structures may also provide collimation of the light exiting the lightguide (see FIG. 20), it is possible, in accordance with the invention, to provide a backlight system that requires fewer sheets of optical film as compared to typical backlight systems. In the embodiment shown in FIG. 25 there is a single, optional, optical film 238, which may be the Diffuse Reflective Polarizer film product (sold as DRPF) or the Specular Reflective Polarizer film product (sold as DBEF) available from Minnesota Mining and Manufacturing Company.

Recycling Backlight Systems

Figure 26:
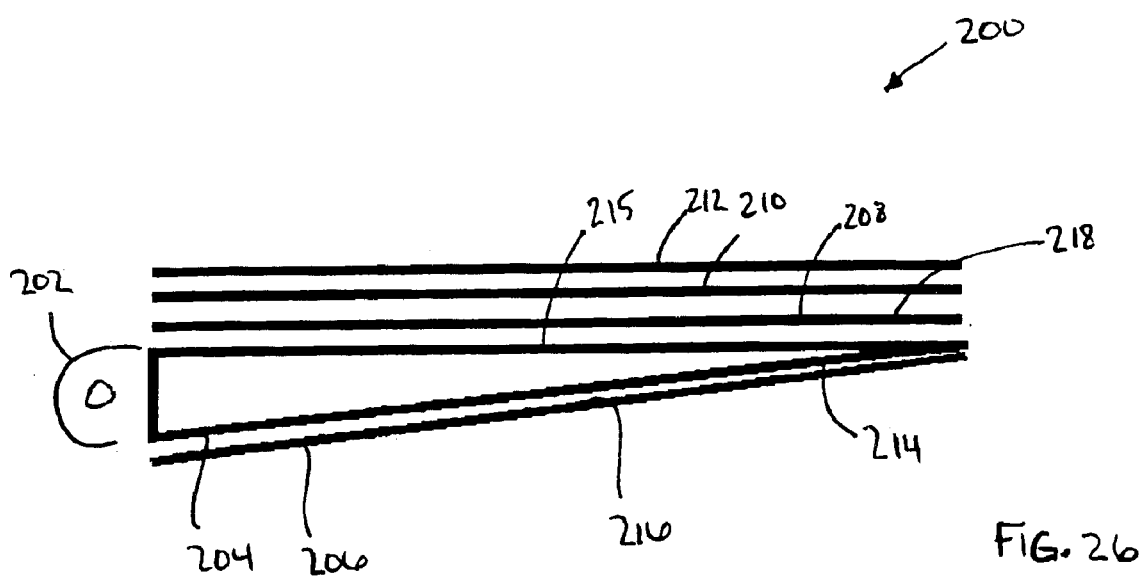

In FIG. 26, a backlight 200 includes a light source 202, a wedge lightguide 204, a back reflector 206 having a surface 216, a turning film 208 having a surface 218 and one or more additional, optional optical films 210 and 212. The lightguide 204 has a front surface 215 and a back surface 214 that is formed with optical structures similar to optical structures 152 shown in connection with the lightguide 144 in FIG. 17. The optical structures may be formed directly in the lightguide 204 by injection molding or casting. Alternatively, the optical structures may be formed in a light transmissive film that is laminated to the back surface 214 of the lightguide 204.

The optical structures formed on the back surface 214 of the lightguide 204 facilitate the extraction of light from the lightguide 204. The optical structures may therefore allow for the elimination of the diffuse dot pattern typically used to extract light from the lightguide. Some light exits the back surface 214, and this light encounters the back reflector 206, and is reflected back through the lightguide 204. A suitable back reflector is the enhanced diffuse reflector (EDR) film product sold by 3M.

Elimination of the dot pattern for extraction of light from the lightguide 204 may reduce the need to add diffusion to mask the appearance of the dot pattern in the output of the backlight 200. The optional optical films 210 and 212 may be brightness enhancing films, such as the aforementioned BEFIII optical film product arranged in a crossed arrangement; Diffuse Reflective Polarizer film product (sold as DRPF) the Specular Reflective Polarizer film product (sold as DBEF) and/or various combinations thereof and all of which are available from Minnesota Mining and Manufacturing Company.

Figure 27:
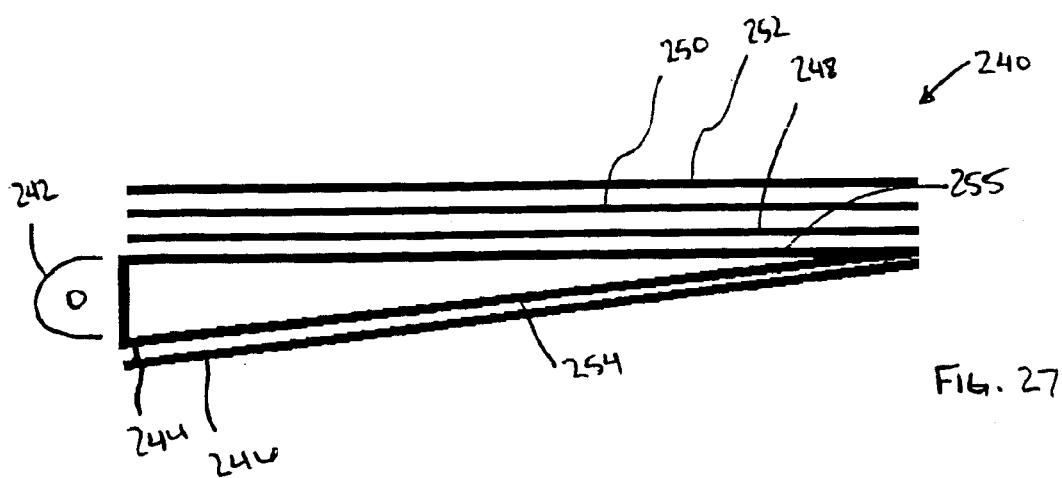

In FIG. 27, a backlight 240 includes a light source 242, a wedge lightguide 244, a back reflector 246, a diffuser 248 and first and second optional additional optical films 250 and 252. The back reflector 246 is preferably secured to a back surface 254 of the lightguide 214 using a dot patterned adhesive, such as described in the aforementioned United States Patent Application entitled "Lightguide Having a Directly Secured Reflector." The adhesive is therefore arranged in a dot pattern typical of an extraction dot pattern.

The lightguide 244 has an output surface 255 that is formed with optical structures (not depicted). The optical structures may have a varying pattern as described above. The optical structures may be formed directly in the lightguide 244 by injection molding or casting, or alternatively, the optical structures may be formed in a light transmissive film that is laminated to the output surface 255 of the lightguide 244.

The optical structures including the varying pattern, as described, may eliminate the need for a diffuser, such as the diffuser 248, to mask the dot pattern, as well as other non-uniformities in the output of the backlight 240. As such, the diffuser 248 is optional. When used, the optional optical films 250 and 252 may be brightness enhancing films, such as the aforementioned BEFIII optical film product, arranged in a crossed arrangement, the Diffuse Reflective Polarizer film product (sold as DRPF) or the Specular Reflective Polarizer film product (sold as DBEF), all of which are available from Minnesota Mining and Manufacturing Company.

Pseudo-Wedge Backlight System

Figure 28:
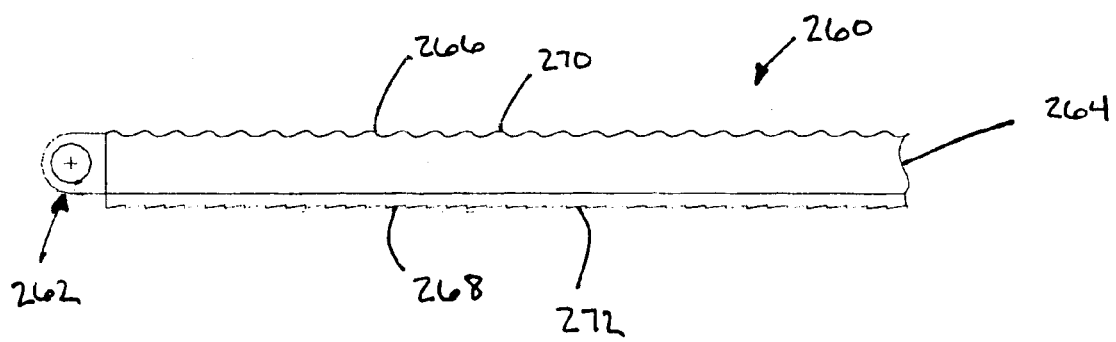

Referring now to FIG. 28, a backlight 260 includes a light source 262 and a pseudo-wedge lightguide 264. The pseudo-wedge lightguide 264 includes a first surface 266 and a second surface 268. The first surface may be formed with optical structures 270, such as optical structures 152 described in connection with FIG. 17. The second surface is formed with faceted groove structures 272 that are arranged to be parallel to the light source 262. The faceted groove structures 272 facilitate extraction of light from the lightguide by enhancing the frustration of total internal reflection. Not shown, the backlight 260 will also include a back reflector disposed adjacent the second surface 268.

The faceted groove structures 272 may have variable angle features. Each individual facet has a facet angle. When the faceted groove structures 272 include a variable angle feature, the individual facet angles vary from facet to facet. This arrangement of the faceted groove structures 272 may reduce the appearance of non-uniformities in an output of the backlight 260.

While the lightguide 264 is shown as a slab structure, the lightguide 264 may be wedge. Furthermore, the faceted groove structures 272 may be formed directly in the lightguide 264, for example by molding or casting, or the faceted groove structures may be formed in an optical film that is laminated to a slab or wedge lightguide. The faceted groove structures may also vary in density as a function of distance from the light source 262.

Still other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A lightguide comprising:
    a first surface;
    a second surface opposing the first surface;
    an input edge surface extending between the first surface and the second surface;
    a plurality of prism grooves formed in the first surface, the prism grooves each having a groove axis and each groove axis being substantially parallel to each other groove axis, wherein the groove axes are arranged to be disposed substantially perpendicular to the input edge surface; and
    each of the plurality of prism grooves having a characteristic affecting the optical properties of the prism groove, the characteristic at least being one of amplitude, aspect ratio and pitch of the prism groove, and the characteristic varying as a function of the location along the groove axis extending from the input edge surface.

2. The lightguide of claim 1, wherein variation in the characteristic of adjacent prism grooves is one of in-phase and out-of-phase.

3. The lightguide of claim 1, wherein the characteristic is arranged to have a greater value along the groove axis at a location arranged to be nearer the input edge surface.

4. The lightguide of claim 1, wherein the characteristic comprises discrete variations of the characteristic along the length of the groove axis.

5. The lightguide of claim 1, wherein the comprises comprise continuous variations of the characteristic along the length of the groove axis.

6. The lightguide of claim 1, wherein the characteristic is related to the optical power of the prism groove and the optical power tapers from a first value to a second value, lesser than the first value along the groove axis from a location on the groove axis arranged to be nearer the input edge to a location on the groove axis arranged to be farther from the input edge.

7. The lightguide of claim 1, comprising optical structures formed in the second surface.

8. A lightguide comprising a surface, a first edge and an opposing second edge, grooves formed in the surface extending from the first edge to the second edge, each groove having a groove axis and the groove axes being substantially aligned, each groove having a characteristic, the characteristic affecting the optical power to the groove, and the characteristic varying along the groove as a function of the location on the groove between the first edge and the second edge, wherein the characteristic is arranged to have a greater value along the groove axis at a location arranged to be nearer the first edge.

9. The lightguide of claim 8, comprising optical structures formed in the second surface.

10. The lightguide of claim 8, wherein the characteristic comprises one of the group of characteristics comprising: amplitude, pitch and aspect ratio.

11. The lightguide of claim 8, wherein the characteristic comprises amplitude, and wherein the amplitude varies along the groove axis.

12. The lightguide of claim 8, wherein variation in the characteristic of adjacent prism grooves is one of in-phase and out-of-phase.

13. The lightguide of claim 8, wherein the optical power is arranged to be greater along the groove axis at a location arranged to be nearer the input edge surface.

14. The lightguide of claim 8, wherein the characteristic varies discretely along a length of the groove axis.

15. The lightguide of claim 8, wherein the characteristic varies continuously along a length of the groove axis.

16. The lightguide of claim 8, wherein the optical power tapers from a first value to a second, lesser than the first value along the groove axis from a location on the groove axis arranged to be nearer the input edge to a location on the groove axis arranged to be farther from the input edge.

17. A lightguide comprising:
    an input edge and a second edge opposing the input edge, a first surface and a second surface;
    grooves formed in each of the first surface and the second surface extending from the input edge to the second edge, each groove having a groove axis and the groove axes being substantially aligned, each of the grooves having a characteristic affecting optical power of the groove, and the varying along the groove as a function of the location along the groove between the input edge and the second edge; and
    wherein the characteristic is arranged to have a greater value along the groove axis at a location arranged to be nearer the input edge.

18. The lightguide of claim 17, wherein the characteristic comprises one of the group of characteristics comprising: amplitude, pitch and aspect ratio.

19. The lightguide of claim 17, wherein the characteristic comprises amplitude, and wherein the amplitude varies along the groove axis.

20. The lightguide of claim 17, wherein variation of the characteristic of adjacent prism grooves is one of in-phase and out-of-phase.

21. The lightguide of claim 17, wherein the characteristic is arranged to have a greater affect on optical power at a location along the groove nearer the input edge surface.

22. The lightguide of claim 17, wherein the characteristic varies discretely along a length of the groove axis.

23. The lightguide of claim 17, wherein the characteristic varies continuously along a length of the groove axis.

24. The lightguide of claim 17, wherein the optical power tapers from a first value to a second, lesser than the first value along the groove axis from a location on the groove axis arranged to be nearer the input edge to a location on the groove axis arranged to be farther from the input edge.

* * * * *

UNITED STATES PATENT AND TRADEMARK OFFICE
CERTIFICATE OF CORRECTION

| | |
|---|---|
| PATENT NO. | : 7,046,905 B1 |
| APPLICATION NO. | : 09/613313 |
| DATED | : May 16, 2006 |
| INVENTOR(S) | : Gardiner, Mark E. |

It is certified that error appears in the above-identified patent and that said Letters Patent is hereby corrected as shown below:

Column 15, Line 25 - In Claim 3, delete "value" and insert -- affect on optical power of the prism groove --, therefor Column 15, Line 30 - In Claim 5, after "the" insert -- characteristics --.

Column 15, Line 31 - In Claim 5, before "continuous" delete "comprise".

Signed and Sealed this

First Day of August, 2006

JON W. DUDAS
*Director of the United States Patent and Trademark Office*